United States Patent
Sasaki et al.

(10) Patent No.: US 8,593,762 B1
(45) Date of Patent: Nov. 26, 2013

(54) MAGNETIC HEAD FOR PERPENDICULAR MAGNETIC RECORDING CAPABLE OF PRODUCING A WRITE MAGNETIC FIELD OF SUFFICIENT MAGNITUDE FROM THE MAIN POLE WHILE REDUCING THE LENGTH OF A MAGNETIC PATH THAT CONNECTS THE WRITE SHIELD AND THE MAIN POLE

(71) Applicants: Yoshitaka Sasaki, Santa Clara, CA (US); Hiroyuki Ito, Milpitas, CA (US); Kazuki Sato, Milpitas, CA (US); Shigeki Tanemura, Milpitas, CA (US); Hironori Araki, Milpitas, CA (US); Tatsuya Shimizu, Hong Kong (CN)

(72) Inventors: Yoshitaka Sasaki, Santa Clara, CA (US); Hiroyuki Ito, Milpitas, CA (US); Kazuki Sato, Milpitas, CA (US); Shigeki Tanemura, Milpitas, CA (US); Hironori Araki, Milpitas, CA (US); Tatsuya Shimizu, Hong Kong (CN)

(73) Assignees: Headway Technologies, Inc., Milpitas, CA (US); SAE Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 13/722,378

(22) Filed: Dec. 20, 2012

(51) Int. Cl.
G11B 5/127 (2006.01)

(52) U.S. Cl.
USPC .................... 360/125.29; 360/123.06

(58) Field of Classification Search
USPC ............ 360/125.17, 125.02, 125.03, 125.29, 360/123.03, 123.06, 123.43
See application file for complete search history.

(56) References Cited

U.S. PATENT DOCUMENTS

| | | | |
|---|---|---|---|
| 6,954,340 B2 | 10/2005 | Shukh et al. | |
| 7,495,864 B2 * | 2/2009 | Kobayashi | 360/123.1 |
| 7,768,744 B2 * | 8/2010 | Hsiao et al. | 360/125.18 |
| 7,983,010 B2 * | 7/2011 | Toma et al. | 360/319 |
| 8,064,160 B2 * | 11/2011 | Ohta et al. | 360/123.05 |
| 8,218,264 B1 * | 7/2012 | Sasaki et al. | 360/125.16 |
| 8,358,487 B2 * | 1/2013 | Sasaki et al. | 360/123.08 |
| 8,422,166 B1 * | 4/2013 | Sasaki et al. | 360/123.06 |
| 8,427,781 B1 * | 4/2013 | Sasaki et al. | 360/125.13 |
| 8,441,755 B2 * | 5/2013 | Sasaki et al. | 360/123.03 |
| 2005/0083608 A1 * | 4/2005 | Watanabe | 360/126 |

FOREIGN PATENT DOCUMENTS

JP A-2001-93113 4/2001

* cited by examiner

Primary Examiner — Brian Miller
(74) Attorney, Agent, or Firm — Oliff & Berridge, PLC

(57) ABSTRACT

A magnetic head includes a coil, a main pole, a write shield, first and second yoke layers, and first and second coupling parts. The first yoke layer is located on the trailing side relative to the main pole whereas the second yoke layer is located on the leading side relative to the main pole. The first coupling part couples the main pole and the first yoke layer to each other. The second coupling part couples the first yoke layer and the second yoke layer to each other. The first coupling part includes a plurality of first magnetic path portions, and the second coupling part includes a plurality of second magnetic path portions. The coil includes one winding portion extending to pass around the first and second magnetic path portions alternately in a zigzag manner.

7 Claims, 17 Drawing Sheets

MAGNETIC HEAD FOR PERPENDICULAR MAGNETIC RECORDING CAPABLE OF PRODUCING A WRITE MAGNETIC FIELD OF SUFFICIENT MAGNITUDE FROM THE MAIN POLE WHILE REDUCING THE LENGTH OF A MAGNETIC PATH THAT CONNECTS THE WRITE SHIELD AND THE MAIN POLE

BACKGROUND OF THE INVENTION

1. Field of the Invention

The present invention relates to a magnetic head for perpendicular magnetic recording that is used for writing data on a recording medium by means of a perpendicular magnetic recording system, and more specifically, to a magnetic head for perpendicular magnetic recording that has a main pole and a shield.

2. Description of the Related Art

The recording systems of magnetic read/write apparatuses include a longitudinal magnetic recording system wherein signals are magnetized in a direction along the plane of a recording medium (the longitudinal direction) and a perpendicular magnetic recording system wherein signals are magnetized in a direction perpendicular to the plane of a recording medium. It is known that the perpendicular magnetic recording system is harder to be affected by thermal fluctuation of the recording medium and capable of providing higher linear recording density, compared with the longitudinal magnetic recording system.

Magnetic heads for perpendicular magnetic recording typically have, like those for longitudinal magnetic recording, a structure where a read head unit having a magnetoresistive element (hereinafter, also referred to as MR element) for reading and a write head unit having an induction-type electromagnetic transducer for writing are stacked on a substrate. The write head unit includes a coil and a main pole. The main pole has an end face located in a medium facing surface facing a recording medium. The coil produces a magnetic field corresponding to data to be written on the recording medium. The main pole allows a magnetic flux corresponding to the magnetic field produced by the coil to pass, and produces a write magnetic field from its end face.

A magnetic head for use in a magnetic disk drive such as a hard disk drive is typically provided in a slider. The slider has the medium facing surface mentioned above. The medium facing surface has an air inflow end (a leading end) and an air outflow end (a trailing end). The slider is designed to slightly fly over the surface of a recording medium by means of an airflow that comes from the air inflow end into the space between the medium facing surface and the recording medium.

Here, the side of positions closer to the leading end relative to a reference position will be defined as the leading side, and the side of positions closer to the trailing end relative to the reference position will be defined as the trailing side. The leading side is the rear side in the direction of travel of the recording medium relative to the slider. The trailing side is the front side in the direction of travel of the recording medium relative to the slider.

The magnetic head is typically disposed near the trailing end of the medium facing surface of the slider. In a magnetic disk drive, positioning of the magnetic head is performed by a rotary actuator, for example. In this case, the magnetic head moves over the recording medium along a circular orbit about the center of rotation of the rotary actuator. In such a magnetic disk drive, a tilt of the magnetic head with respect to the tangent of the circular track, which is called a skew, occurs according to the position of the magnetic head across the tracks.

In particular, in a magnetic disk drive of the perpendicular magnetic recording system which is higher in capability of writing on a recording medium than the longitudinal magnetic recording system, the skew mentioned above can cause the phenomenon that signals already written on one or more tracks in the neighborhood of a track targeted for writing are erased or attenuated during writing of a signal on the track targeted for writing. In the present application, this phenomenon will be called unwanted erasure. Unwanted erasure includes adjacent track erasure (ATE) and wide-area track erasure (WATE). To achieve higher recording density, it is necessary to prevent unwanted erasure.

In order to prevent unwanted erasure induced by the skew and achieve higher recording density, it is effective to provide a write shield in the vicinity of the main pole. For example, U.S. Pat. No. 6,954,340 B2 discloses a magnetic head including a write shield having an end face that is located in the medium facing surface to wrap around an end face of the main pole.

A magnetic head including a write shield is typically provided with a return path section for connecting the write shield to a part of the main pole away from the medium facing surface. One or more spaces are formed between the return path section and the main pole. A coil or coils are provided to pass through the one or more spaces. The write shield and the return path section have the function of capturing a magnetic flux that is produced from the end face of the main pole and spreads in directions other than a direction perpendicular to the plane of the recording medium, so as to prevent the magnetic flux from reaching the recording medium. The write shield and the return path section also have the function of allowing a magnetic flux that has been produced from the end face of the main pole and has magnetized the recording medium to flow back to the main pole. A magnetic head having the write shield and the return path section is capable of preventing unwanted erasure and capable of providing further improved recording density.

The position of an end of a record bit to be recorded on a recording medium depends on the position of the trailing-side end of the end face of the main pole located in the medium facing surface. To define the position of the end of the record bit with high accuracy, it is therefore effective to form the end face of the write shield to include an end face portion located on the trailing side relative to the end face of the main pole.

As the frequency of write signals is increased in order to provide higher recording density, it is required of the magnetic head to provide an improved rate of change in the direction of the magnetic flux produced from the end face of the main pole. To satisfy this requirement in the magnetic head having a write shield, it is effective to form the end face of the write shield to include an end face portion located on the trailing side relative to the end face of the main pole. In addition to this, it is particularly effective to provide the return path section with a yoke layer located on the trailing side relative to the main pole and to reduce the length of a magnetic path that connects the write shield and the main pole to each other through the yoke layer. To that end, it is effective to reduce the number of turns of the coil passing through the space formed between the main pole and the yoke layer. However, this would cause a shortage of magnetomotive force produced by the coil, thereby hindering the main pole from producing a write magnetic field of sufficient magnitude.

As such, it has conventionally been difficult to allow the main pole to produce a write magnetic field of sufficient magnitude while reducing the length of a magnetic path that connects the write shield and the main pole to each other through a yoke layer located on the front side in the direction of travel of the recording medium (i.e., the trailing side) relative to the main pole.

OBJECT AND SUMMARY OF THE INVENTION

It is an object of the present invention to provide a magnetic head for perpendicular magnetic recording capable of producing a write magnetic field of sufficient magnitude from the main pole while reducing the length of a magnetic path that connects the write shield and the main pole to each other through a yoke layer located on the front side in the direction of travel of a recording medium relative to the main pole.

A magnetic head for perpendicular magnetic recording of the present invention includes a medium facing surface facing a recording medium, a coil producing a magnetic field corresponding to data to be written on the recording medium, a main pole, a write shield made of a magnetic material, a gap part made of a nonmagnetic material, first and second yoke layers each made of a magnetic material and magnetically connected to the write shield, and first and second coupling parts. The main pole has an end face located in the medium facing surface. The main pole allows a magnetic flux corresponding to the magnetic field produced by the coil to pass, and produces a write magnetic field for writing data on the recording medium by means of a perpendicular magnetic recording system. The write shield has an end face located in the medium facing surface. The gap part is interposed between the main pole and the write shield.

The first yoke layer is located on the front side in the direction of travel of the recording medium relative to the main pole. The second yoke layer is located on the rear side in the direction of travel of the recording medium relative to the main pole. The first coupling part is located away from the medium facing surface and magnetically couples the main pole and the first yoke layer to each other. The second coupling part is located away from the medium facing surface and magnetically couples the first yoke layer and the second yoke layer to each other without touching the main pole. The end face of the write shield includes a first end face portion located on the front side in the direction of travel of the recording medium relative to the end face of the main pole.

The first coupling part includes one or more first magnetic path portions that allow a first magnetic flux passing through the first coupling part to pass therethrough. The second coupling part includes one or more second magnetic path portions that allow a second magnetic flux passing through the second coupling part to pass therethrough. One or both of the first and second magnetic path portions are two or more in number so as to separate one or both of the first and second magnetic fluxes into two or more magnetic fluxes traveling in parallel to each other. The one or more first magnetic path portions and the one or more second magnetic path portions are disposed to intersect a cross section perpendicular to the direction of travel of the recording medium. The coil includes one first winding portion extending to pass around the first and second magnetic path portions alternately in a zigzag manner. One or more magnetic fields produced in the one or more first magnetic path portions by the first winding portion and one or more magnetic fields produced in the one or more second magnetic path portions by the first winding portion are in directions opposite to each other.

In the magnetic head for perpendicular magnetic recording of the present invention, the end face of the write shield may further include a second end face portion located on the rear side in the direction of travel of the recording medium relative to the end face of the main pole. In this case, the end face of the write shield may further include third and fourth end face portions located on opposite sides of the end face of the main pole in the track width direction.

In the magnetic head for perpendicular magnetic recording of the present invention, both of the first and second magnetic path portions may be two or more in number. Alternatively, the number of the one or more first magnetic path portions may be two, and the number of the one or more second magnetic path portions may be one. Alternatively, the number of the one or more first magnetic path portions may be one, and the number of the one or more second magnetic path portions may be two.

In the magnetic head for perpendicular magnetic recording of the present invention, the coil may further include a second winding portion wound around the second coupling part. The second winding portion is located at a position different from that of the first winding portion in the direction of travel of the recording medium.

In the magnetic head for perpendicular magnetic recording of the present invention, there are formed first and second magnetic paths that lead from the write shield to the main pole. The first magnetic path passes through the first yoke layer and the first coupling part. The second magnetic path passes through the second yoke layer, the second coupling part, the first yoke layer, and the first coupling part. The present invention allows a reduction in length of the first magnetic path. Further, the present invention allows the main pole to produce a write magnetic field of sufficient magnitude because magnetomotive forces are generated in the first and second coupling parts, and one or both of the first and second magnetic path portions are two or more in number. Thus, according to the present invention, it is possible to produce a write magnetic field of sufficient magnitude from the main pole while reducing the length of the magnetic path connecting the write shield and the main pole to each other through the first yoke layer located on the front side in the direction of travel of the recording medium relative to the main pole.

Further, according to the present invention, the one first winding portion extending to pass around the first and second magnetic path portions alternately in a zigzag manner produces magnetic fields in the one or more first magnetic path portions and the one or more second magnetic path portions in directions opposite to each other. Consequently, according to the present invention, it is possible to generate magnetomotive forces in the first and second coupling parts efficiently with a simplified structure without an increase in size of the coil.

Other and further objects, features and advantages of the present invention will appear more fully from the following description.

DETAILED DESCRIPTION OF THE PREFERRED EMBODIMENTS

First Embodiment

Figure 1:
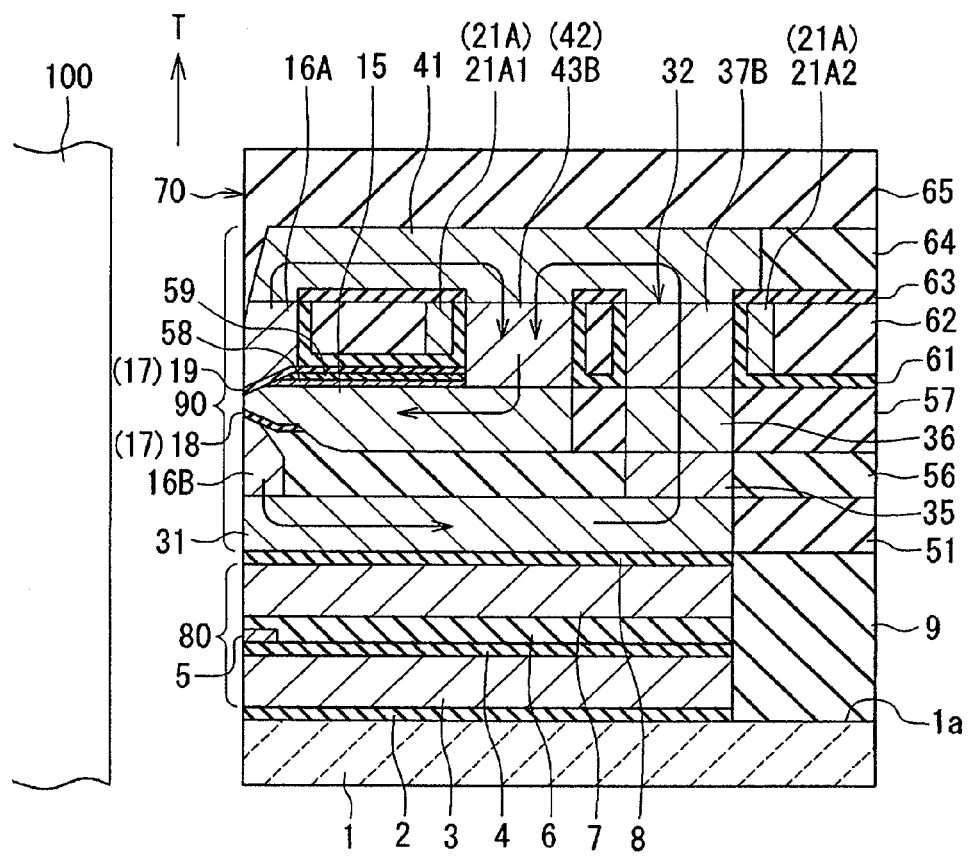
FIG. 1 is a cross-sectional view showing a magnetic head according to a first embodiment of the invention.
Figure 2:
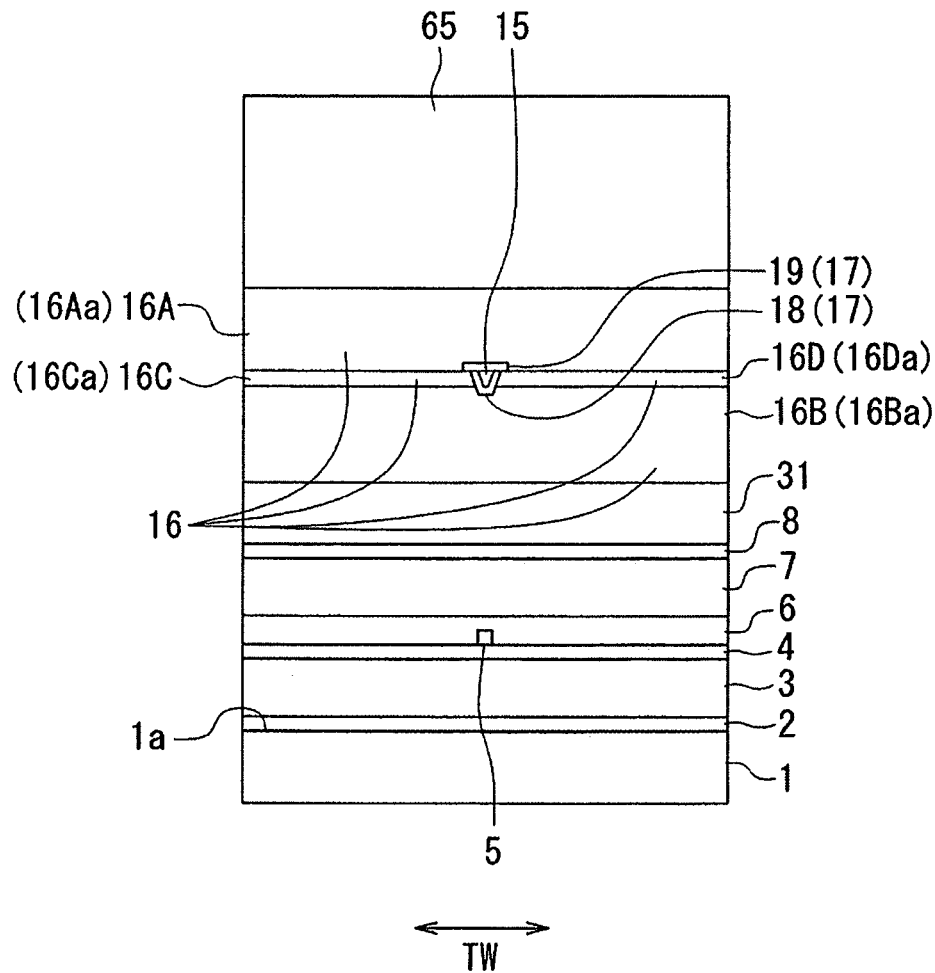
FIG. 2 is a front view showing the medium facing surface of the magnetic head according to the first embodiment of the invention.
Figure 3:
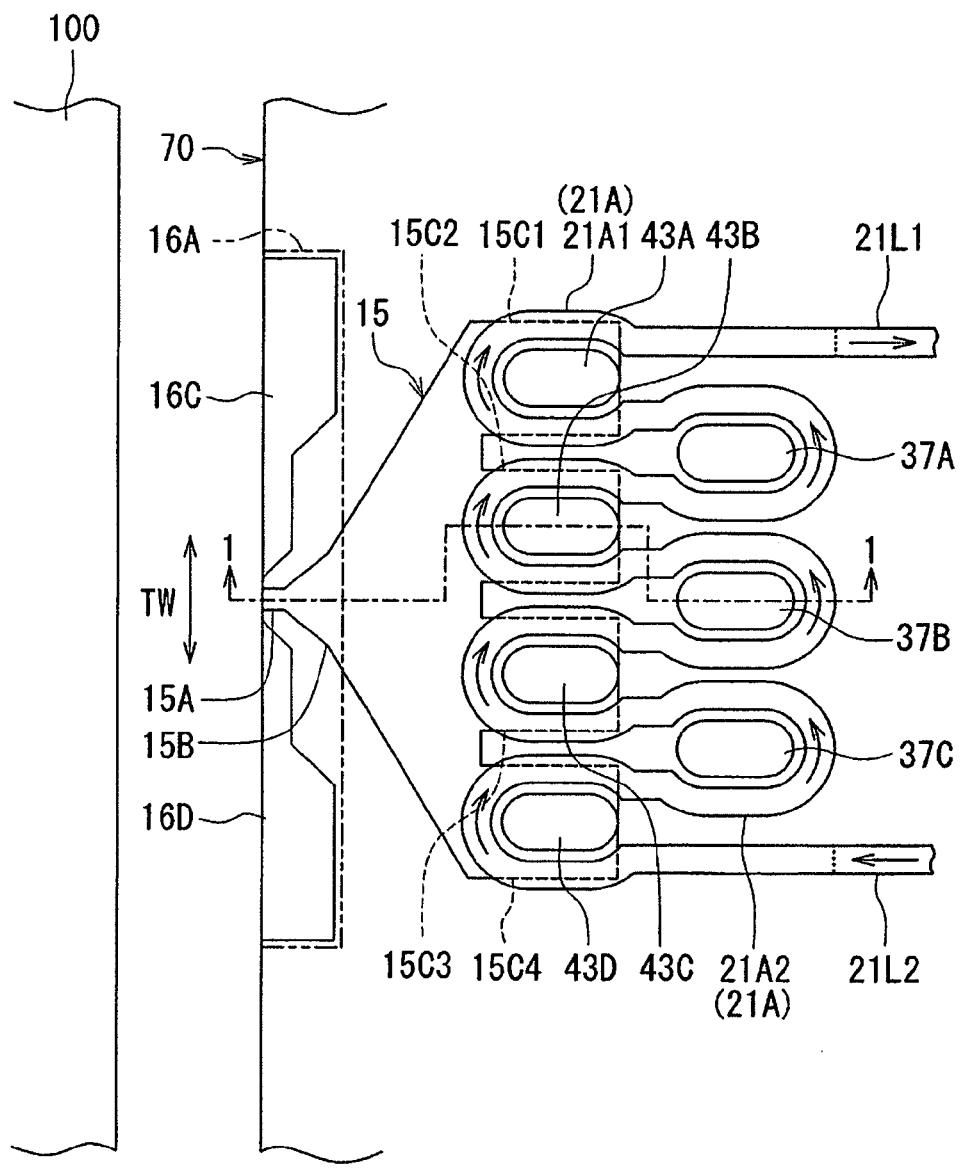
FIG. 3 is a plan view showing the main part of the magnetic head according to the first embodiment of the invention.

Preferred embodiments of the present invention will now be described in detail with reference to the drawings. First, reference is made to FIG. 1 to FIG. 3 to describe the configuration of a magnetic head according to a first embodiment of the invention. FIG. 1 is a cross-sectional view showing the magnetic head according to the present embodiment. The arrow with the symbol T in FIG. 1 indicates the direction of travel of a recording medium. The arrows drawn within the magnetic head in FIG. 1 indicate the flows of magnetic flux. FIG. 2 is a front view showing the medium facing surface of the magnetic head according to the present embodiment. FIG. 3 is a plan view showing the main part of the magnetic head according to the present embodiment. FIG. 1 shows a cross section taken at the position indicated by line 1-1 of FIG. 3. In each of FIG. 2 and FIG. 3, the arrow with the symbol TW indicates the track width direction. In FIG. 3, the arrows drawn within the coil indicate the direction of electric current flowing through the coil. Also in any other plan views illustrating a coil, arrows drawn within the coil indicate the direction of electric current flowing through the coil.

The magnetic head for perpendicular magnetic recording (hereinafter simply referred to as a magnetic head) according to the present embodiment is in the form of a slider to fly over the surface of a rotating recording medium. When the recording medium rotates, an airflow passing between the recording medium and the slider causes a lift to be exerted on the slider. The slider is configured to fly over the surface of the recording medium by means of the lift. As shown in FIG. 1, the magnetic head has a medium facing surface 70 facing a recording medium 100.

As shown in FIG. 1 and FIG. 2, the magnetic head includes: a substrate 1 made of a ceramic material such as aluminum oxide-titanium carbide ($Al_2O_3$—TiC) and having a top surface 1a; an insulating layer 2 made of an insulating material such as alumina ($Al_2O_3$) and disposed on the top surface 1a of the substrate 1; a bottom shield layer 3 made of a magnetic material and disposed on the insulating layer 2; a bottom shield gap film 4 which is an insulating film disposed to cover the bottom shield layer 3; a magnetoresistive (MR) element 5 serving as a read element disposed on the bottom shield gap film 4; a top shield gap film 6 which is an insulating film disposed on the MR element 5; and a top shield layer 7 made of a magnetic material and disposed on the top shield gap film 6.

An end of the MR element 5 is located in the medium facing surface 70. The MR element 5 may be an element made of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current used for detecting magnetic signals is fed in a direction generally parallel to the planes of layers constituting the GMR element or the current-perpendicular-to-plane (CPP) type in which the current used for detecting magnetic signals is fed in a direction generally perpendicular to the planes of layers constituting the GMR element.

The parts from the bottom shield layer 3 to the top shield layer 7 constitute a read head unit 80. The magnetic head further includes nonmagnetic layers 8 and 9. The nonmagnetic layer 8 is disposed on the top shield layer 7. The nonmagnetic layer 9 is disposed on the top surface 1a of the substrate 1 and surrounds the read head unit 80 and the nonmagnetic layer 8. The top surfaces of the nonmagnetic layers 8 and 9 are even with each other. The nonmagnetic layers 8 and 9 are made of alumina, for example.

The magnetic head further includes a write head unit 90 disposed on the nonmagnetic layers 8 and 9. The write head unit 90 includes a coil, a main pole 15, a write shield 16, and a gap part 17. The coil produces a magnetic field corresponding to data to be written on the recording medium 100. The coil is made of a conductive material such as copper. The main pole 15 has an end face located in the medium facing surface 70. The main pole 15 allows a magnetic flux corresponding to the magnetic field produced by the coil to pass, and produces a write magnetic field for writing data on the recording medium 100 by means of a perpendicular magnetic recording system.

The write shield 16 has an end face located in the medium facing surface 70. As shown in FIG. 2, the end face of the write shield 16 includes first to fourth end face portions 16Aa, 16Ba, 16Ca, and 16Da. The first end face portion 16Aa is located on the front side in the direction T of travel of the recording medium 100 relative to the end face of the main pole 15. The second end face portion 16Ba is located on the rear side in the direction T of travel of the recording medium 100 relative to the end face of the main pole 15. The third and fourth end face portions 16Ca and 16Da are located on opposite sides of the end face of the main pole 15 in the track width direction TW. In the medium facing surface 70, the first to fourth end face portions 16Aa, 16Ba, 16Ca, and 16Da are arranged to wrap around the end face of the main pole 15.

The write shield 16 is made of a magnetic material. The material employed for the write shield 16 may be CoFeN, CoNiFe, NiFe, or CoFe, for example.

The write head unit 90 further includes a first yoke layer 41, a second yoke layer 31, a first coupling part 42, and a second coupling part 32. The first yoke layer 41 is located on the front side in the direction T of travel of the recording medium 100 relative to the main pole 15, and is magnetically connected to the write shield 16. The second yoke layer 31 is located on the rear side in the direction T of travel of the recording medium 100 relative to the main pole 15, and is magnetically connected to the write shield 16.

The first coupling part 42 is located away from the medium facing surface 70 and magnetically couples the main pole 15 and the first yoke layer 41 to each other. The second coupling part 32 is located away from the medium facing surface 70 and magnetically couples the first yoke layer 41 and the second yoke layer 31 to each other without touching the main pole 15. In the example shown in FIG. 1, the second coupling part 32 is located farther from the medium facing surface 70 than is the first coupling part 42.

The first coupling part 42 includes one or more first magnetic path portions. The second coupling part 32 includes magnetic layers 35 and 36, and one or more second magnetic path portions. In the present embodiment, as shown in FIG. 3, the first coupling part 42 includes four first magnetic path portions 43A, 43B, 43C, and 43D as the one or more first magnetic path portions. The second coupling part 32 includes three second magnetic path portions 37A, 37B, and 37C as the one or more second magnetic path portions. Hereinafter, any first magnetic path portion will be represented by reference numeral 43 and any second magnetic path portion by reference numeral 37.

The first yoke layer 41, the second yoke layer 31, the first coupling part 42, and the second coupling part 32 are each made of a magnetic material. For example, CoFeN, CoNiFe, NiFe, or CoFe can be employed as the material of each of the first yoke layer 41, the second yoke layer 31, the first coupling part 42 and the second coupling part 32.

As shown in FIG. 2, the write shield 16 includes a first shield 16A, a second shield 16B, and two side shields 16C and 16D. The two side shields 16C and 16D are located on opposite sides of the main pole 15 in the track width direction TW. The first shield 16A is located on the front side in the direction T of travel of the recording medium 100 relative to the main pole 15. The second shield 16B is located on the rear side in the direction T of travel of the recording medium 100 relative to the main pole 15. The side shields 16C and 16D magnetically couple the first shield 16A and the second shield 16B to each other.

As shown in FIG. 1 and FIG. 2, the first shield 16A has the first end face portion 16Aa, and also has a top surface, a bottom surface, and a connecting surface connecting the first end face portion 16Aa and the top surface to each other. The distance from the medium facing surface 70 to an arbitrary point on the connecting surface of the first shield 16A increases with increasing distance from the arbitrary point to the top surface 1a of the substrate 1. The second shield 16B has the second end face portion 16Ba, and also has a top surface and a bottom surface. The distance from the top surface 1a of the substrate 1 to an arbitrary point on the top surface of the second shield 16B decreases with increasing distance from the arbitrary point to the medium facing surface 70. As shown in FIG. 2, the side shield 16C has the third end face portion 16Ca. The side shield 16D has the fourth end face portion 16Da.

The second yoke layer 31 is located on the nonmagnetic layer 8. The second shield 16B and the magnetic layer 35 are both located on the second yoke layer 31. The second shield 16B is located near the medium facing surface 70. The magnetic layer 35 is located farther from the medium facing surface 70 than is the second shield 16B. In the present embodiment, the second yoke layer 31 has an end face located in the medium facing surface 70.

The magnetic head further includes an insulating layer 51 made of an insulating material and a nonmagnetic layer 56 made of a nonmagnetic material. The insulating layer 51 is located on the magnetic layers 8 and 9 and surrounds the second yoke layer 31. The nonmagnetic layer 56 is located on part of the top surface of the second yoke layer 31 and on the top surface of the insulating layer 51, and surrounds the second shield 16B and the magnetic layer 35. The insulating layer 51 and the nonmagnetic layer 56 are made of alumina, for example.

The main pole 15 has a top surface (see FIG. 1), which is the surface located at a forward end in the direction T of travel of the recording medium 100, and has a bottom end (see FIG. 1) opposite to the top surface. The main pole 15 further has first and second side parts (see FIG. 2) that are opposite to each other in the track width direction TW. The side shield 16C has a first sidewall opposed to the first side part of the main pole 15. The side shield 16D has a second sidewall opposed to the second side part of the main pole 15.

The gap part 17 is interposed between the main pole 15 and the write shield 16. The magnetic head further includes a first gap layer 19 made of a nonmagnetic material and a second gap layer 18 made of a nonmagnetic material. A portion of the first gap layer 19 constitutes a portion of the gap part 17. A portion of the second gap layer 18 constitutes another portion of the gap part 17. The portion of the first gap layer 19 constituting the portion of the gap part 17 is located between the main pole 15 and the first shield 16A. The portion of the second gap layer 18 constituting the other portion of the gap part 17 is located between the main pole 15 and each of the second shield 16B and the side shields 16C and 16D.

The side shields 16C and 16D are located on the second shield 16B and in contact with the top surface of the second shield 16B. The second gap layer 18 is arranged to extend along the sidewalls of the side shields 16C and 16D, the top surface of the second shield 16B, and part the top surface of the nonmagnetic layer 56. The nonmagnetic material employed to form the second gap layer 18 may be an insulating material or a nonmagnetic metal material. Alumina is an example of an insulating material that can be employed to form the second gap layer 18. Ru is an example of a nonmagnetic metal material that can be employed to form the second gap layer 18.

The main pole 15 is disposed on the second shield 16B and the nonmagnetic layer 56 such that the second gap layer 18 is interposed between the main pole 15 and each of the top surface of the second shield 16B and part of the top surface of the nonmagnetic layer 56. As shown in FIG. 2, the second gap layer 18 is interposed also between the main pole 15 and each of the side shields 16C and 16D.

The main pole 15 is made of a magnetic metal material. The material employed for the main pole 15 may be NiFe, CoNiFe, or CoFe. The shape of the main pole 15 will be described in detail later.

The magnetic layer 36 is disposed on the magnetic layer 35. The magnetic head further includes a nonmagnetic layer 57 made of a nonmagnetic material and disposed around the main pole 15, the side shields 16C and 16D, and the magnetic layer 36. In the present embodiment, the nonmagnetic layer 57 is made of a nonmagnetic insulating material such as alumina, in particular.

The magnetic head further includes a nonmagnetic metal layer 58 made of a nonmagnetic metal material, located at a distance from the medium facing surface 70 and lying on a part of the top surface of the main pole 15, and an insulating layer 59 made of an insulating material and lying on the top surface of the nonmagnetic metal layer 58. The nonmagnetic metal layer 58 is made of Ru, NiCr, or NiCu, for example. The insulating layer 59 is made of alumina, for example.

The first gap layer 19 is disposed to cover the main pole 15, the nonmagnetic metal layer 58 and the insulating layer 59. The first gap layer 19 may be made of a nonmagnetic insulating material such as alumina or a nonmagnetic conductive material such as Ru, NiCu, Ta, W, NiB, or NiP.

The first shield 16A is disposed over the side shields 16C and 16D and the first gap layer 19, and is in contact with the top surfaces of the side shields 16C and 16D and the first gap layer 19. In the medium facing surface 70, part of the first end face portion 16Aa of the first shield 16A is separated from the end face of the main pole 15 by a predetermined distance created by the thickness of the first gap layer 19. The thickness of the first gap layer 19 preferably falls within the range of 5 to 60 nm, and may be 30 to 60 nm, for example. The end face of the main pole 15 has a side that is adjacent to the first gap layer 19, and the side defines the track width.

The first magnetic path portions 43A to 43D are located on the main pole 15 and away from the medium facing surface 70. The second magnetic path portions 37A to 37C are located on the magnetic layer 36.

As shown in FIG. 3, the coil includes one first winding portion 21A extending to pass around the first magnetic path portions 43A to 43D and the second magnetic path portions 37A to 37C alternately in a zigzag manner, and two lead portions 21L1 and 21L2 connected to opposite ends of the first winding portion 21A. In FIG. 3, the boundaries between these portions are shown by dotted lines. The first winding portion 21A, the first magnetic path portions 43A to 43D, and the second magnetic path portions 37A to 37C will be described in detail later.

Although not illustrated, the width of the magnetic layer 36 in the track width direction TW is equal to or greater than the distance between the outer ends of an assemblage of the second magnetic path portions 37A to 37C in the track width direction TW. The width of the magnetic layer 35 in the track width direction TW may be the same as or different from the width of the magnetic layer 36.

The magnetic head further includes an insulating film 61 and an insulating layer 62 each made of an insulating material. The insulating film 61 isolates the first winding portion 21A from the first shield 16A, the first gap layer 19, the first magnetic path portions 43 and the second magnetic path portions 37. The insulating layer 62 is disposed around the first winding portion 21A, the lead portions 21L1 and 21L2, and the first shield 16A. The top surfaces of the first winding portion 21A, the lead portions 21L1 and 21L2, the first shield 16A, the first magnetic path portions 43, the second magnetic portions 37, the insulating film 61 and the insulating layer 62 are even with each other. The magnetic head further includes an insulating layer 63 made of an insulating material and disposed over the top surfaces of the first winding portion 21A, the lead portions 21L1 and 21L2, the insulating film 61 and the insulating layer 62. The insulating film 61 and the insulating layers 62 and 63 are made of alumina, for example.

The first yoke layer 41 is disposed over the first shield 16A, the first magnetic path portions 43A to 43D, the second magnetic path portions 37A to 37C, and the insulating layer 63. The first yoke layer 41 has an end face facing toward the medium facing surface 70 and located at a distance from the medium facing surface 70. The distance from the medium facing surface 70 to an arbitrary point on the end face of the first yoke layer 41 increases with increasing distance from the arbitrary point to the top surface 1a of the substrate 1.

The magnetic head further includes an insulating layer 64 made of an insulating material and disposed around the first yoke layer 41. The insulating layer 64 is made of alumina, for example.

The magnetic head further includes a protective layer 65 made of a nonmagnetic material and disposed to cover the write head unit 90. The protective layer 65 is made of, for example, an inorganic insulating material such as alumina.

As has been described, the magnetic head according to the present embodiment includes the medium facing surface 70, the read head unit 80, and the write head unit 90. The read head unit 80 and the write head unit 90 are stacked on the substrate 1. The read head unit 80 is located on the rear side in the direction T of travel of the recording medium 100 (i.e., the leading side) relative to the write head unit 90.

The write head unit 90 includes the coil, the main pole 15, the write shield 16, the gap part 17, the first yoke layer 41, the second yoke layer 31, the first coupling part 42, and the second coupling part 32.

As shown in FIG. 1, the first yoke layer 41 and the first coupling part 42 form a first magnetic path that is located on the front side in the direction T of travel of the recording medium 100 relative to the main pole 15 and connects the write shield 16 and part of the main pole 15 away from the medium facing surface 70 to each other. The second yoke layer 31, the second coupling part 32, the first yoke layer 41 and the first coupling part 42 form a second magnetic path connecting the write shield 16 and part of the main pole 15 away from the medium facing surface 70 to each other. A magnetic flux corresponding to the magnetic field produced by the coil passes through the first and second magnetic paths.

In the present invention, the first coupling part 42 includes one or more magnetic path portions 43 that allow a first magnetic flux passing through the first coupling part 42 to pass therethrough, and the second coupling part 32 includes one or more second magnetic path portions 37 that allow a second magnetic flux passing through the second coupling part 32 to pass therethrough. One or both of the first and second magnetic path portions 43 and 37 are two or more in number so as to separate one or both of the first and second magnetic fluxes into two or more magnetic fluxes traveling in parallel to each other. In the present embodiment, the first coupling part 42 includes the four first magnetic path portions 43A, 43B, 43C and 43D, and the second coupling part 32 includes the three second magnetic path portions 37A, 37B and 37C. The first magnetic path portions 43A to 43D separate the first magnetic flux into four magnetic fluxes traveling in parallel to each other. The second magnetic path portions 37A to 37C separate the second magnetic flux into three magnetic fluxes traveling in parallel to each other.

FIG. 3 shows a cross section perpendicular to the direction T of travel of the recording medium 100. In the present embodiment, the first magnetic path portions 43 and the second magnetic path portions 37 intersect a cross section perpendicular to the direction T of travel of the recording medium 100, such as one shown in FIG. 3.

The write shield 16 captures a disturbance magnetic field applied to the magnetic head from the outside thereof. This makes it possible to prevent erroneous writing on the recording medium 100 induced by the disturbance magnetic field intensively captured into the main pole 15. The write shield 16 also has the function of capturing a magnetic flux produced from the end face of the main pole 15 and spreading in directions other than a direction perpendicular to the plane of the recording medium 100, so as to prevent the magnetic flux from reaching the recording medium 100. The write shield 16 and the first and second magnetic path portions have the function of allowing a magnetic flux that has been produced from the end face of the main pole 15 and has magnetized the recording medium 100 to flow back.

The shape of the main pole 15 will now be described in detail with reference to FIG. 1 to FIG. 3. As shown in FIG. 1 and FIG. 2, the main pole 15 has the top surface located at the forward end in the direction T of travel of the recording medium 100, the bottom end opposite to the top surface, the first side part, and the second side part. Further, as shown in FIG. 3, the main pole 15 includes a track width defining portion 15A, a wide portion 15B, and a plurality of branch portions. The track width defining portion 15A has an end face located in the medium facing surface 70 and an end portion opposite to the end face. The wide portion 15B has a front end portion connected to the end portion of the track width defining portion 15A, and a rear end portion opposite thereto. The plurality of branch portions are connected to the rear end portion of the wide portion 15B.

The top surface of the main pole 15 includes the top surface of the track width defining portion 15A, the top surface of the wide portion 15B, and the top surfaces of the plurality of branch portions. The top surface of the wide portion 15B is greater than the top surface of the track width defining portion 15A in width in the track width direction TW. The width of the top surface of the track width defining portion 15A in the track width direction TW is generally constant regardless of the distance from the medium facing surface 70. The width of the top surface of the wide portion 15B in the track width direction TW is, for example, equal to that of the top surface of the track width defining portion 15A at the boundary between the track width defining portion 15A and the wide portion 15B, and increases with increasing distance from the medium facing surface 70. Here, the length of the track width defining portion 15A in a direction perpendicular to the medium facing surface 70 will be referred to as the neck height. The neck height falls within the range of 0 to 0.3 μm, for example. A zero neck height means that there is no track width defining portion 15A and thus the wide portion 15B has an end face located in the medium facing surface 70.

The plurality of branch portions are arranged side by side in the track width direction TW with spacing therebetween. In the present embodiment, the main pole 15 includes four branch portions 15C1, 15C2, 15C3, and 15C4 as the plurality of branch portions. The width of the top surface of each of the branch portions 15C1 to 15C4 in the track width direction TW is generally constant regardless of the distance from the medium facing surface 70, and is smaller than ¼ the maximum width of the top surface of the main pole 15 in the track width direction TW.

The top surface of the main pole 15 includes an inclined portion and a flat portion arranged in this order, the inclined portion being closer to the medium facing surface 70. The inclined portion has a first end located in the medium facing surface 70 and a second end opposite thereto. The flat portion is connected to the second end of the inclined portion. The inclined portion is inclined such that its second end is located on the front side in the direction T of travel of the recording medium 100 relative to its first end.

The flat portion extends in a direction substantially perpendicular to the medium facing surface 70. The bottom surface of the first shield 16A includes a portion that is opposed to the inclined portion of the top surface of the main pole 15 with the first gap layer 19 interposed therebetween.

The bottom end of the main pole 15 includes a first inclined portion, a first flat portion, a second inclined portion, and a second flat portion arranged in this order, the first inclined portion being closest to the medium facing surface 70. The first inclined portion has a first end located in the medium facing surface 70 and a second end opposite thereto. The first flat portion is connected to the second end of the first inclined portion. The second inclined portion has a first end connected to the first flat portion and a second end that is located farther from the medium facing surface 70 than is the first end. Each of the first inclined portion, the first flat portion and the second inclined portion may be an edge formed by two intersecting planes, or may be a plane connecting two planes to each other. The second flat portion is a plane connected to the second end of the second inclined portion. The first and second inclined portions are inclined such that their respective second ends are located on the rear side in the direction T of travel of the recording medium 100 relative to their respective first ends. The first and second flat portions extend in a direction substantially perpendicular to the medium facing surface 70.

The end face of the main pole 15 located in the medium facing surface 70 has a first side adjacent to the first gap layer 19, a second side connected to one end of the first side, and a third side connected to the other end of the first side. The first side defines the track width. The position of an end of a record bit to be recorded on the recording medium 100 depends on the position of the first side. The width in the track width direction TW of the end face of the main pole 15 located in the medium facing surface 70 decreases with increasing distance from the first side, that is, with increasing proximity to the top surface 1a of the substrate 1. Each of the second side and the third side forms an angle of, for example, 7° to 17°, or preferably 10° to 15°, relative to a direction perpendicular to the top surface 1a of the substrate 1. The first side has a length in the range of 0.05 to 0.20 μm, for example.

The first winding portion 21A of the coil, the first magnetic path portions 43A to 43D, and the second magnetic path portions 37A to 37C will now be described in detail with reference to FIG. 3. As shown in FIG. 3, the first magnetic path portions 43A to 43D are located on the branch portions 15C1 to 15C4 of the main pole 15, respectively. The second magnetic path portions 37A to 37C are located farther from the medium facing surface 70 than are the main pole 15 and the first magnetic path portions 43A to 43D.

The first magnetic path portions 43A, 43B, 43C, and 43D are arranged in this order from the top of FIG. 3. The second magnetic path portions 37A, 37B, and 37C are arranged in this order from the top of FIG. 3. Concerning the positional relation in the track width direction TW, the magnetic path portion 37A is located between the magnetic path portions 43A and 43B, the magnetic path portion 37B is located between the magnetic path portions 43B and 43C, and the magnetic path portion 37C is located between the magnetic path portions 43C and 43D.

As previously mentioned, the first winding portion 21A extends to pass around the first and second magnetic path portions 43 and 37 alternately in a zigzag manner. In the present embodiment, as shown in FIG. 3, the first winding portion 21A extends from the top of FIG. 3 to be wound approximately one turn around each of the magnetic path portions 43A, 37A, 43B, 37B, 43C, 37C, and 43D in this order. Of the first winding portion 21A, a portion wound around each of the first magnetic path portions 43A to 43D will hereinafter be represented by symbol 21A1, and a portion wound around each of the second magnetic path portions 37A to 37C will hereinafter be represented by symbol 21A2.

A description will now be made as to the direction of electric current flowing through the first winding portion 21A. When electric current flows through the lead portion 21L2, the first winding portion 21A, and the lead portion 21L1 in this order as shown in FIG. 3, the flow of the electric current through the portion 21A1 of the first winding portion 21A is in a clockwise direction, as viewed from above, around each of the first magnetic path portions 43A to 43D. On the other hand, the flow of the electric current through the portion 21A2 of the first winding portion 21A is in a counterclockwise direction, as viewed from above, around each of the second magnetic path portions 37A to 37C. In this case, four magnetic fields that are produced in the first magnetic path portions 43A to 43D by the electric current flowing through the portion 21A1 are directed in a first direction from the first yoke layer 41 toward the main pole 15 shown in FIG. 1. On the other hand, three magnetic fields that are produced in the second magnetic path portions 37A to 37C by the electric current flowing through the portion 21 A2 are directed in a second direction from the magnetic layer 36 toward the first yoke layer 41 shown in FIG. 1. The first direction and the second direction are opposite to each other.

When electric current flows through the lead portion 21L1, the first winding portion 21A, and the lead portion 21L2 in this order which is reverse to the order in the example shown in FIG. 3, the directions of the electric current and the magnetic fields are opposite to the above-described directions.

A description will now be given of the specific function and effects of the magnetic head according to the present embodiment. As the frequency of write signals is increased in order to provide higher recording density, the magnetic head is required to be improved in the rate of change in the direction of the magnetic flux produced from the end face of the main pole 15. The position of an end of a record bit depends on the position of an end of the end face of the main pole 15 located in the medium facing surface 70, the end being located on the front side in the direction T of travel of the recording medium 100. To provide higher recording density, it is therefore required to improve the rate of change in the direction of the magnetic flux produced from the end face of the main pole 15 and also the rate of change in the direction of the magnetic flux passing through the first shield 16A of the write shield 16. To meet these requirements, it is effective to reduce the length of the first magnetic path passing through the first yoke layer 41 and the first coupling part 42, of magnetic paths leading from the write shield 16 to the main pole 15.

In the present embodiment, the first coupling part 42 includes the first magnetic path portions 43A to 43D. The portion 21A1 of the first winding portion 21A is wound approximately one turn, i.e., the minimum number of turns, around each of the first magnetic path portions 43A to 43D. The present embodiment thus allows a reduction in length of the first magnetic path. Consequently, it is possible to improve both the rate of change in the direction of the magnetic flux produced from the end face of the main pole 15 and the rate of change in the direction of the magnetic flux passing through the first shield 16A, and to thereby provide higher recording density.

Further, in the present embodiment, the second magnetic path passing through the second yoke layer 31, the second coupling part 32, the first yoke layer 41 and the first coupling part 42 is provided in addition to the first magnetic path, as a magnetic path leading from the write shield 16 to the main pole 15. The second coupling part 32 includes the second magnetic path portions 37A to 37C. In the present embodiment, the portion 21A2 of the first winding portion 21A is wound approximately one turn around each of the second magnetic path portions 37A to 37C. Thus, in the present embodiment, the electric current flowing through the first winding portion 21A generates magnetomotive forces in the first coupling part 42 and the second coupling part 32, and one or both of the first and second magnetic path portions 43 and 37 are two or more in number. This makes it possible for the main pole 15 to produce a write magnetic field of sufficient magnitude.

As can be seen from the foregoing, the present embodiment allows the main pole 15 to produce a write magnetic field of sufficient magnitude while allowing a reduction in length of the first magnetic path.

Further, in the present embodiment, the one first winding portion 21A extending to pass around the first and second magnetic path portions 43 and 37 alternately in a zigzag manner can produce magnetic fields in the first magnetic path portions 43A to 43D and the second magnetic path portions 37A to 37C in directions opposite to each other. Consequently, according to the present embodiment, it is possible to generate magnetomotive forces in the first and second coupling parts 42 and 32 efficiently with a simplified structure without an increase in size of the coil.

Further, in the present embodiment, the first magnetic path portions 43A to 43D and the second magnetic path portions 37A to 37C intersect a cross section perpendicular to the direction T of travel of the recording medium 100. The present embodiment thus allows the first magnetic path portions 43A to 43D and the second magnetic path portions 37A to 37C to be located in one plane parallel to the aforementioned cross section. Consequently, according to the present embodiment, it is possible to form the first winding portion 21A easily.

In the present embodiment, the number of the one or more first magnetic path portions 43 is four, and the number of the one or more second magnetic path portions 37 is three. As will be described later in relation to other embodiments, the numbers of the first and second magnetic path portions 43 and 37 are not limited to those in the example of the present embodiment. However, in order to allow the first winding portion 21A to extend to pass around all the first and second magnetic path portions 43 and 37 alternately in a zigzag manner, the numbers of the first and second magnetic path portions 43 and 37 need to be the same or different by one.

Second Embodiment

Figure 4:
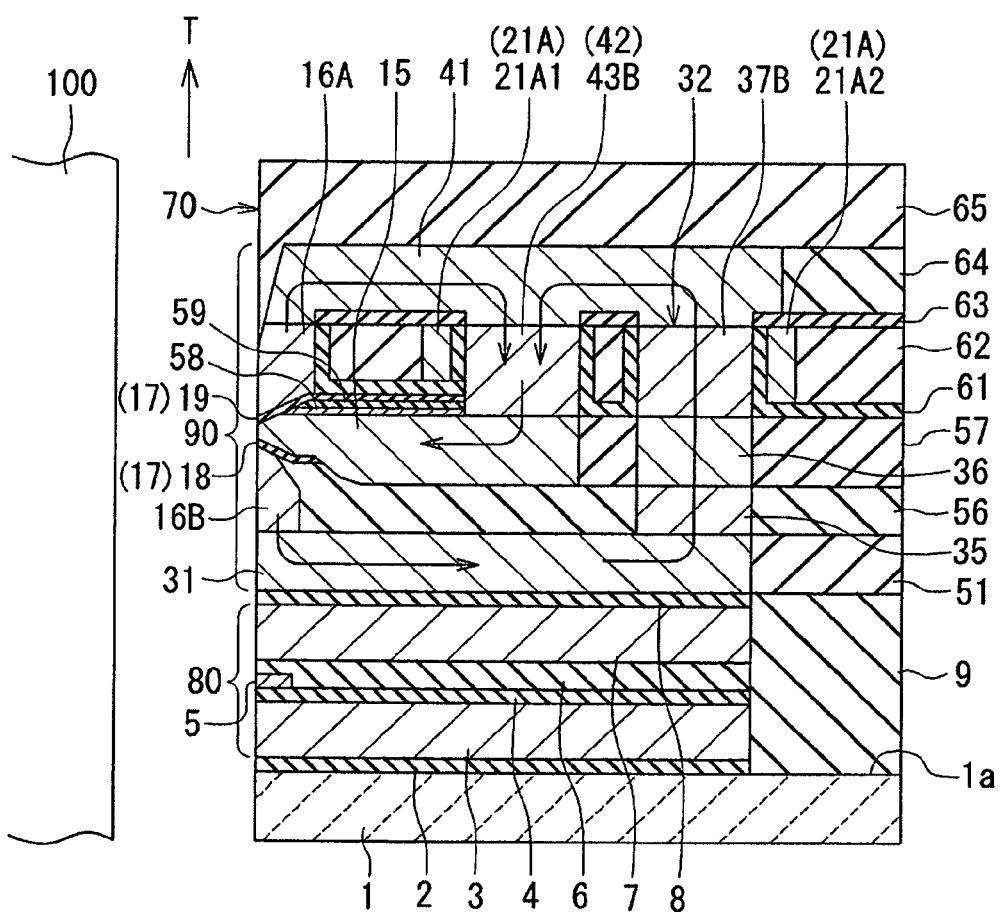
FIG. 4 is a cross-sectional view showing a magnetic head according to a second embodiment of the invention.
Figure 5:
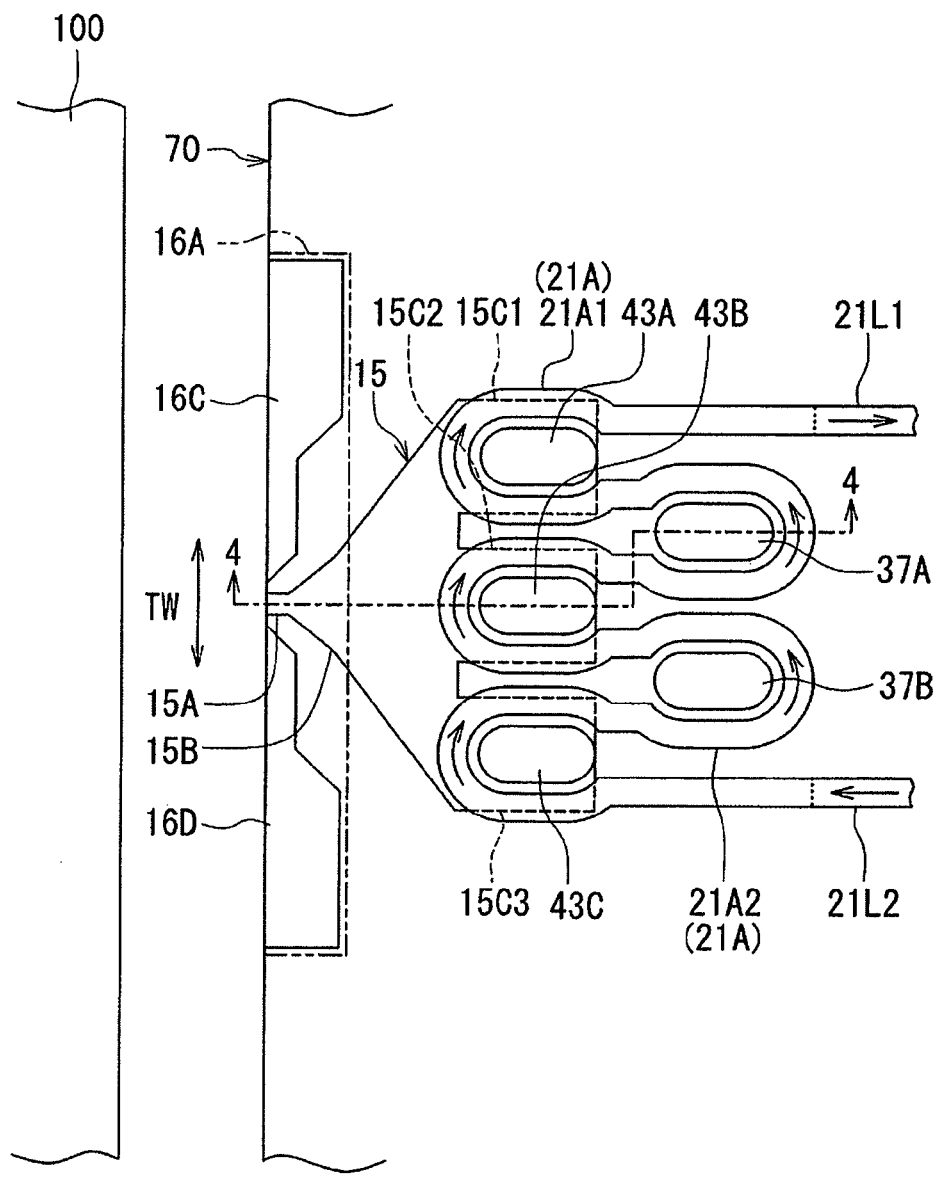
FIG. 5 is a plan view showing the main part of the magnetic head according to the second embodiment of the invention.

A magnetic head according to a second embodiment of the invention will now be described with reference to FIG. 4 and FIG. 5. FIG. 4 is a cross-sectional view showing the magnetic head according to the present embodiment. FIG. 5 is a plan view showing the main part of the magnetic head according to the present embodiment. Note that FIG. 4 shows a cross section taken at the position indicated by line 4-4 of FIG. 5.

The magnetic head according to the present embodiment is different from the magnetic head according to the first embodiment in the following ways. In the magnetic head according to the present embodiment, the main pole 15 includes three branch portions 15C1, 15C2, and 15C3 as the plurality of branch portions. The width of the top surface of each of the branch portions 15C1 to 15C3 in the track width direction TW is generally constant regardless of the distance from the medium facing surface 70, and is smaller than ⅓ the maximum width of the top surface of the main pole 15 in the track width direction TW.

Further, in the present embodiment, the first coupling part 42 includes three first magnetic path portions 43A, 43B, and 43C as the one or more first magnetic path portions 43, and the second coupling part 32 includes two second magnetic path portions 37A and 37B as the one or more second magnetic path portions 37. As shown in FIG. 5, the first magnetic path portions 43A to 43C are located on the branch portions 15C1 to 15C3 of the main pole 15, respectively. The second magnetic path portions 37A and 37B are located farther from the medium facing surface 70 than are the main pole 15 and the first magnetic path portions 43A to 43C.

The first magnetic path portions 43A, 43B, and 43C are arranged in this order from the top of FIG. 5. The second magnetic path portions 37A and 37B are arranged in this order from the top of FIG. 5. Concerning the positional relation in the track width direction TW, the magnetic path portion 37A is located between the magnetic path portions 43A and 43B, and the magnetic path portion 37B is located between the magnetic path portions 43B and 43C. In the present embodiment, the first winding portion 21A of the coil extends from the top of FIG. 5 to be wound approximately one turn around each of the magnetic path portions 43A, 37A, 43B, 37B, and 43C in this order.

In the present embodiment, the number of the one or more first magnetic path portions 43 is three, and the number of the one or more second magnetic path portions 37 is two. The remainder of configuration, function and effects of the present embodiment are similar to those of the first embodiment.

Third Embodiment

Figure 6:
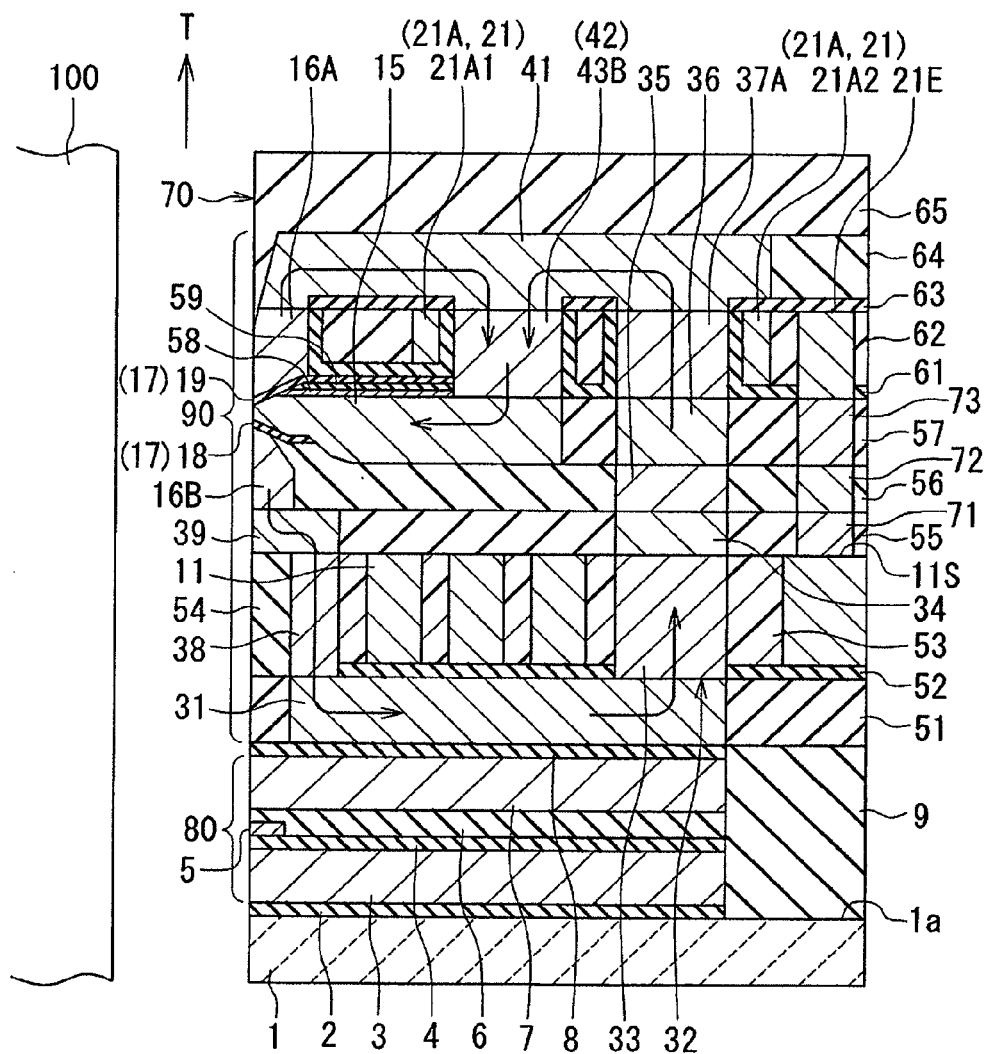
FIG. 6 is a cross-sectional view showing a magnetic head according to a third embodiment of the invention.
Figure 7:
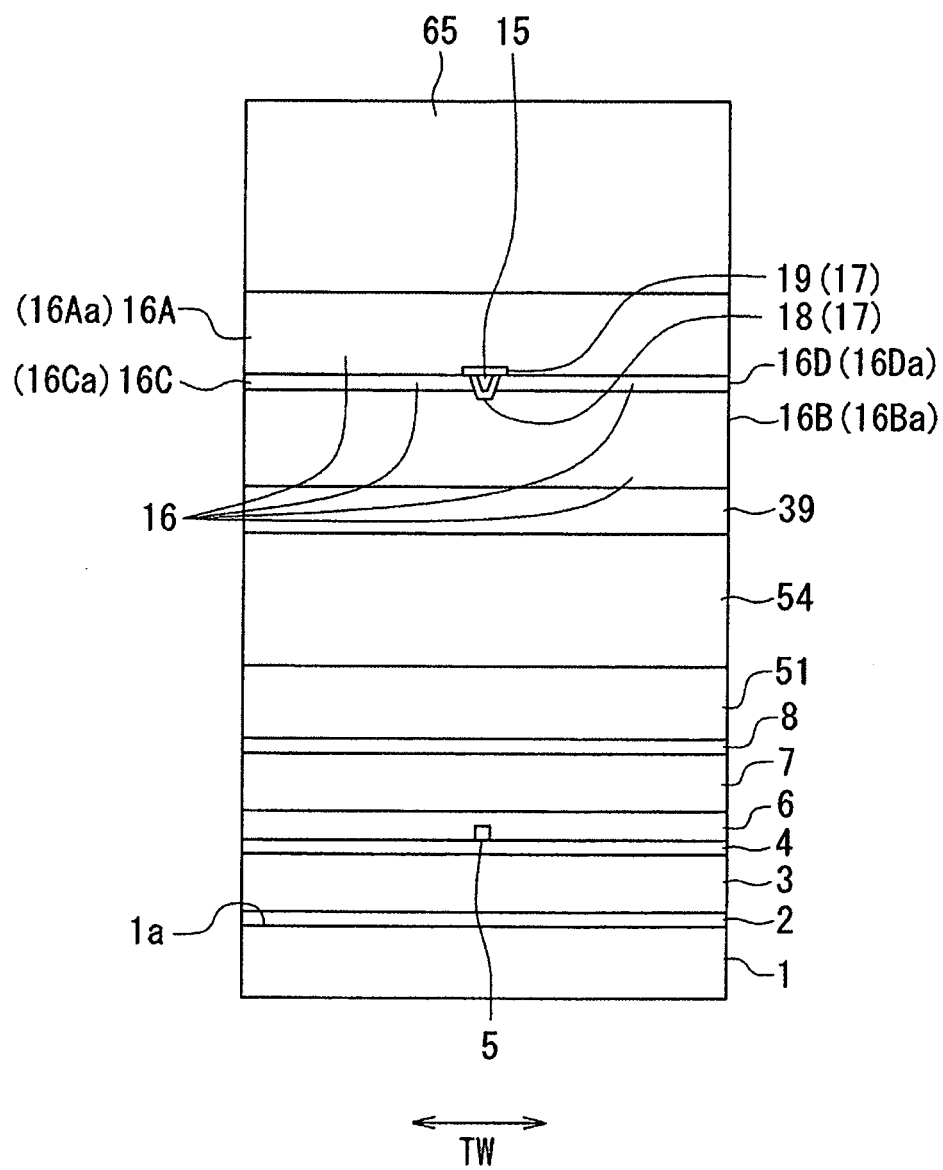
FIG. 7 is a front view showing the medium facing surface of the magnetic head according to the third embodiment of the invention.
Figure 8:
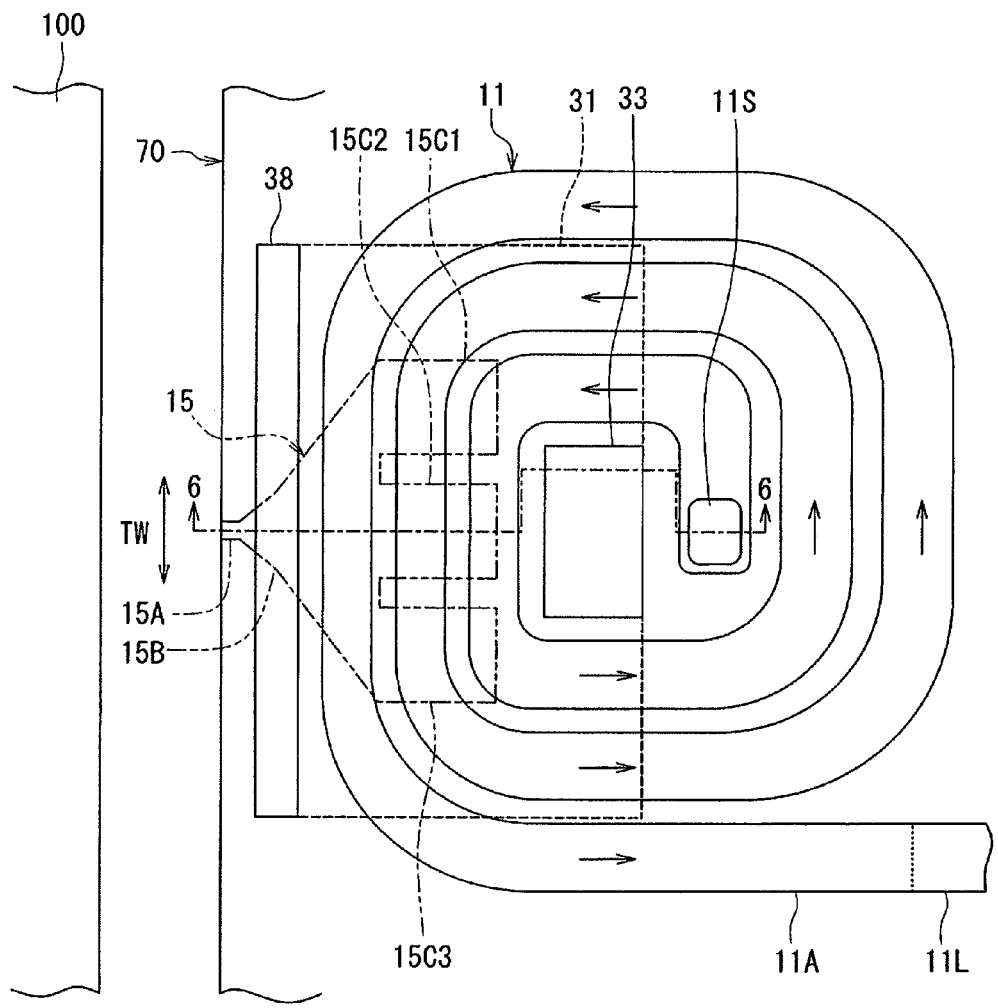
FIG. 8 is a plan view showing a second portion of a coil of the magnetic head according to the third embodiment of the invention.
Figure 9:
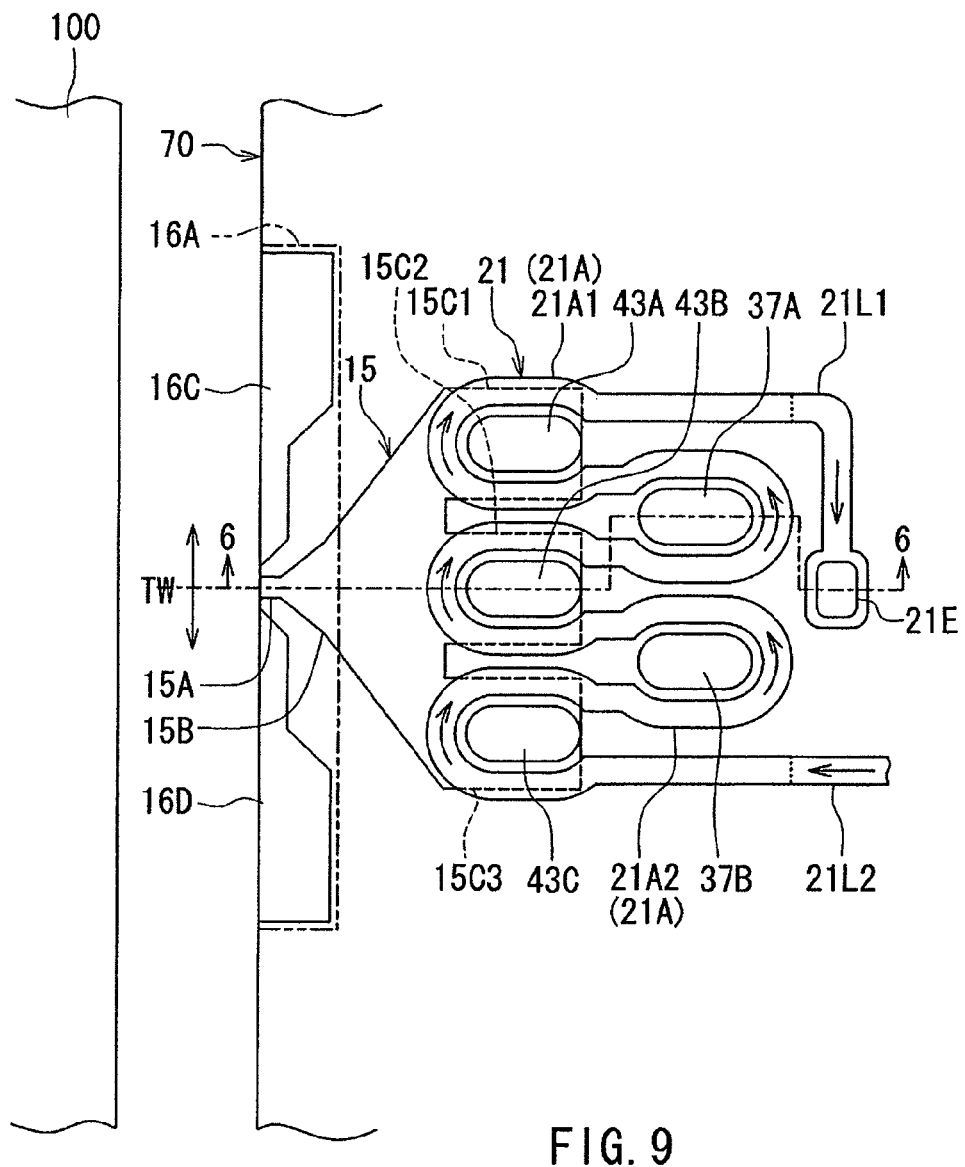
FIG. 9 is a plan view showing the main part of the magnetic head according to the third embodiment of the invention.

A magnetic head according to a third embodiment of the invention will now be described with reference to FIG. 6 to FIG. 9. FIG. 6 is a cross-sectional view showing the magnetic head according to the present embodiment. FIG. 7 is a front view showing the medium facing surface of the magnetic head according to the present embodiment. FIG. 8 is a plan view showing a second portion of the coil of the magnetic head according to the present embodiment. FIG. 9 is a plan view showing the main part of the magnetic head according to the present embodiment. Note that FIG. 6 shows a cross section taken at the position indicated by line 6-6 of FIG. 8 and FIG. 9.

The magnetic head according to the present embodiment is different from the magnetic head according to the second embodiment in the following ways. The magnetic head according to the present embodiment includes magnetic layers 38 and 39 coupling the write shield 16 and the second yoke layer 31 to each other. The magnetic layers 38 and 39 are made of, for example, the same material as the second coupling part 32 described in the first embodiment section. Further, in the present embodiment, the second coupling part 32 includes magnetic layers 33 and 34 in addition to the magnetic layers 35 and 36 and the second magnetic path portions 37. The magnetic layers 33 and 38 are both located on the second yoke layer 31. The magnetic layer 38 is located near the medium facing surface 70. The magnetic layer 33 is located farther from the medium facing surface 70 than is the magnetic layer 38. Each of the second yoke layer 31 and the magnetic layer 38 has an end face facing toward the medium facing surface 70 and located at a distance from the medium facing surface 70.

Further, in the present embodiment, the coil includes a first portion 21 and a second portion 11. The first portion 21 and the second portion 11 will be described in detail later.

The magnetic head further includes insulating layers 52, 53 and 54 each made of an insulating material. The insulating layer 52 lies on the second yoke layer 31 and the insulating layer 51 and surrounds the magnetic layers 33 and 38. The second portion 11 lies on the insulating layer 52. The insulating layer 53 is disposed in the space between adjacent turns of the second portion 11 and around the magnetic layers 33 and 38. The insulating layer 54 is disposed around the magnetic layer 38 and the second portion 11. The top surfaces of the second portion 11, the magnetic layers 33 and 38 and the insulating layers 53 and 54 are even with each other. The insulating layers 52 and 54 are made of alumina, for example. The insulating layer 53 is made of photoresist, for example.

The magnetic layer 34 lies on the magnetic layer 33. The magnetic layer 39 lies on the magnetic layer 38 and the insulating layer 54. The magnetic layer 39 has an end face located in the medium facing surface 70. The magnetic head further includes an insulating layer 55 made of an insulating material. The insulating layer 55 lies on the second portion 11 and the insulating layers 53 and 54, and surrounds the magnetic layers 34 and 39. The insulating layer 55 is made of alumina, for example.

In the present embodiment, the second shield 16B lies on the magnetic layer 39. The magnetic layer 35 lies on the magnetic layer 34. The nonmagnetic layer 57 lies on the magnetic layer 39 and the insulating layer 55.

The first portion 21 and the second portion 11 of the coil will now be described in detail with reference to FIG. 8 and FIG. 9. As shown in FIG. 8, the second portion 11 includes a second winding portion 11A wound around the magnetic layer 33 which constitutes part of the second coupling part 32, and a lead portion 11L contiguous with the second winding portion 11A. In FIG. 8, the boundary between the second winding portion 11A and the lead portion 11L is shown by a dotted line. The second winding portion 11A is wound approximately three turns around the magnetic layer 33. The second winding portion 11A has a coil connection part 11S electrically connected to the first portion 21. As viewed from above, the second winding portion 11A is wound in a counterclockwise direction from the coil connection part 11S toward the boundary between the second winding portion 11A and the lead portion 11L.

As shown in FIG. 9, the first portion 21 includes the first winding portion 21A described in the second embodiment section, and lead portions 21L1 and 21L2 connected to opposite ends of the first winding portion 21A. The first winding portion 21A and the lead portion 21L2 are shaped and positioned in the same manner as in the second embodiment. The lead portion 21L1 has a coil connection part 21E electrically connected to the coil connection part 11S of the second winding portion 11A of the second portion 11.

The coil connection part 21E is electrically connected to the coil connection part 11S via connection layers 71, 72 and 73 which penetrate a plurality of layers interposed between the first portion 21 and the second portion 11. The connection layers 71 to 73 are stacked in this order on the coil connection part 11S. The connection layer 71 is embedded in the insulating layer 55. The connection layer 72 is embedded in the nonmagnetic layer 56. The connection layer 73 is embedded in the nonmagnetic layer 57. The coil connection part 21E is located on the connection layer 73. The connection layers 71 to 73 are each made of a conductive material such as copper.

In the example shown in FIG. 8 and FIG. 9, the first portion 21 and the second portion 11 are connected in series. A magnetic flux corresponding to the magnetic field produced by the first portion 21 passes through the first and second magnetic paths described in the first embodiment section. A magnetic flux corresponding to the magnetic field produced by the second portion 11 passes through the second magnetic path described in the first embodiment section. Note that the first portion 21 and the second portion 11 may be connected in parallel.

In the present embodiment, the coil includes the second winding portion 11A in addition to the first winding portion 21A. According to the present embodiment, it is thus possible to increase the magnetomotive force produced by the coil to allow the main pole 15 to produce a write magnetic field of greater magnitude. Further, in the present embodiment, the location of the second winding portion 11A is different from that of the first winding portion 21A in the direction T of travel of the recording medium 100. Thus, the location of the second winding portion 11A is not restricted by the location of the first winding portion 21A. This allows the second winding portion 11A to be easily increased in the number of turns.

The remainder of configuration, function and effects of the present embodiment are similar to those of the second embodiment.

Fourth Embodiment

Figure 10:
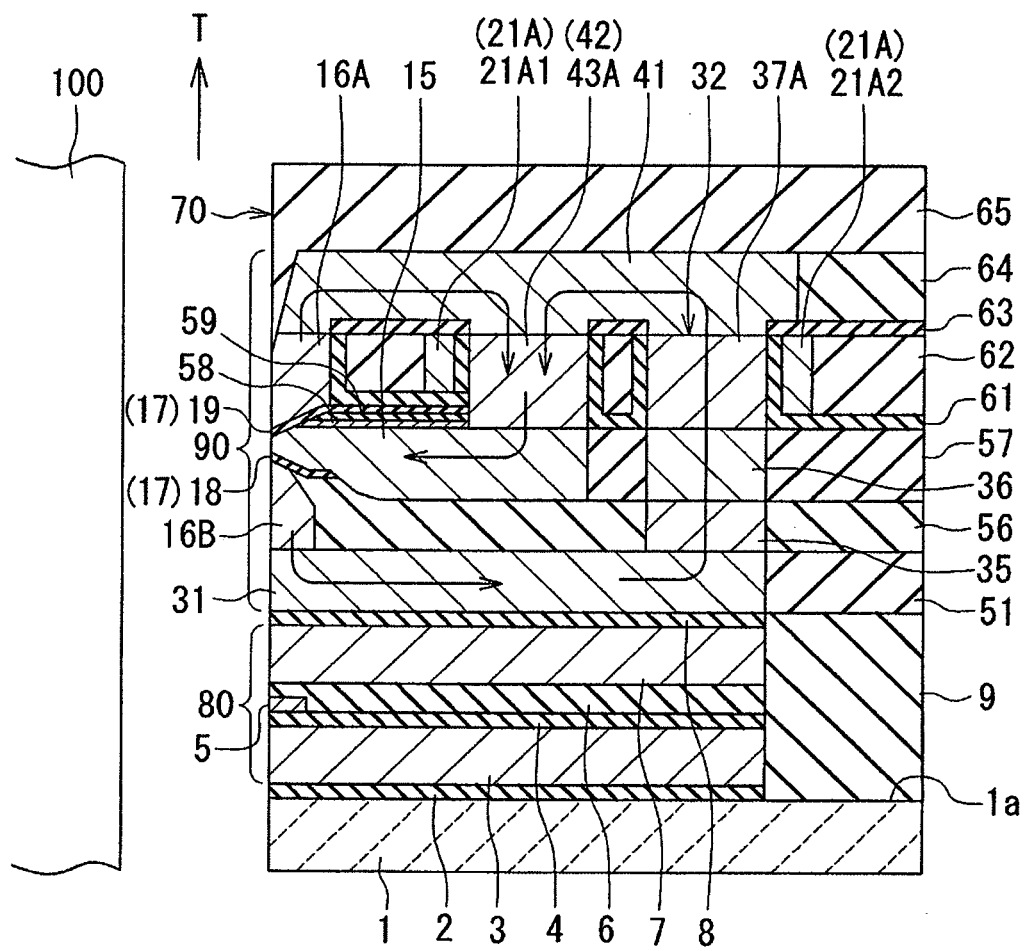
FIG. 10 is a cross-sectional view showing a magnetic head according to a fourth embodiment of the invention.
Figure 11:
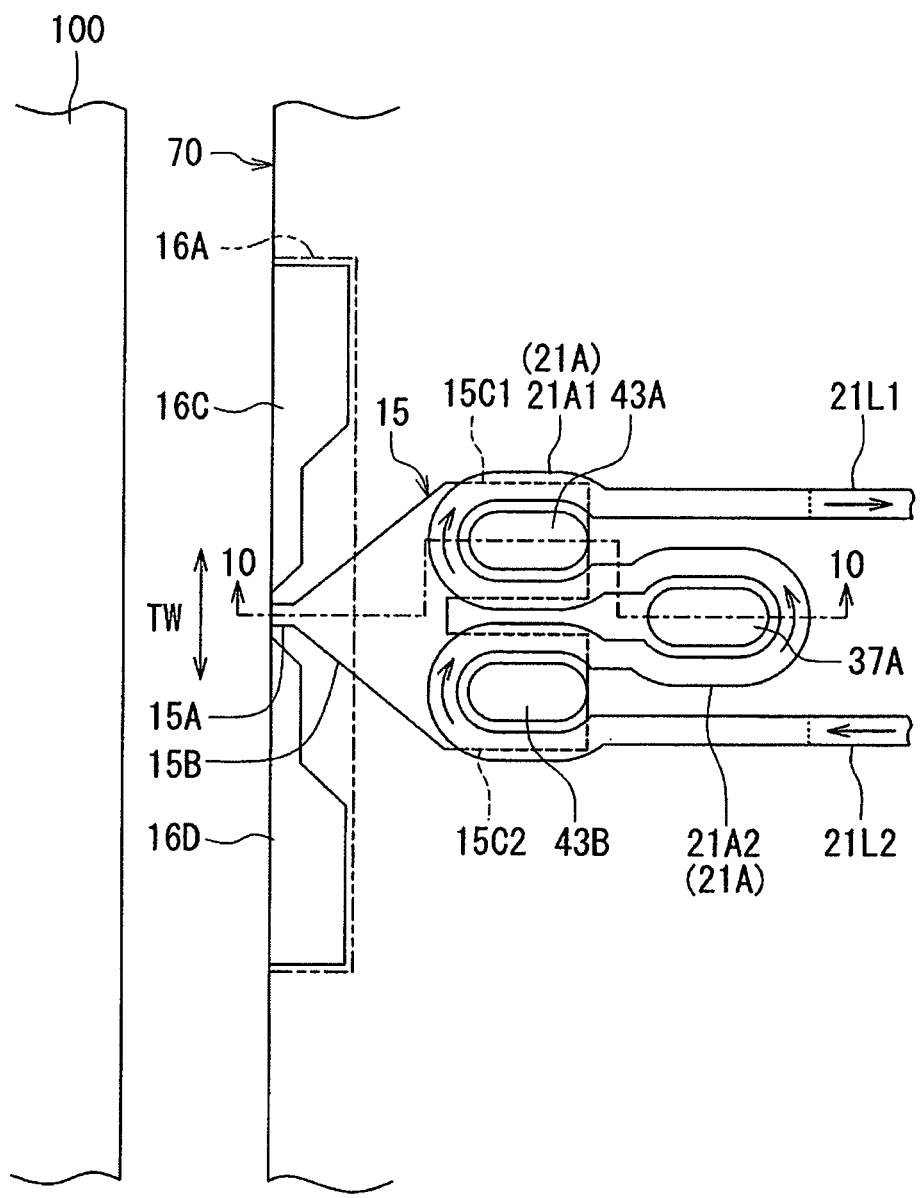
FIG. 11 is a plan view showing the main part of the magnetic head according to the fourth embodiment of the invention.

A magnetic head according to a fourth embodiment of the invention will now be described with reference to FIG. 10 and FIG. 11. FIG. 10 is a cross-sectional view showing the magnetic head according to the present embodiment. FIG. 11 is a plan view showing the main part of the magnetic head according to the present embodiment. Note that FIG. 10 shows a cross section taken at the position indicated by line 10-10 of FIG. 11.

The magnetic head according to the present embodiment is different from the magnetic head according to the first embodiment in the following ways. In the magnetic head according to the present embodiment, the main pole 15 includes two branch portions 15C1 and 15C2 as the plurality of branch portions. The width of the top surface of each of the branch portions 15C1 and 15C2 in the track width direction TW is generally constant regardless of the distance from the medium facing surface 70, and is smaller than ½ the maximum width of the top surface of the main pole 15 in the track width direction TW.

Further, in the present embodiment, the first coupling part 42 includes two first magnetic path portions 43A and 43B as the one or more first magnetic path portions 43, and the second coupling part 32 includes one second magnetic path portion 37A as the one or more second magnetic path portions 37. As shown in FIG. 11, the first magnetic path portions 43A and 43B are located on the branch portions 15C1 and 15C2 of the main pole 15, respectively. The second magnetic path portion 37A is located farther from the medium facing surface 70 than are the main pole 15 and the first magnetic path portions 43A and 43B.

The first magnetic path portions 43A and 43B are arranged in this order from the top of FIG. 11. Concerning the positional relation in the track width direction TW, the magnetic path portion 37A is located between the magnetic path portions 43A and 43B. In the present embodiment, the first winding portion 21A of the coil extends from the top of FIG. 11 to be wound approximately one turn around each of the magnetic path portions 43A, 37A, and 43B in this order.

In the present embodiment, the number of the one or more first magnetic path portions 43 is two, and the number of the one or more second magnetic path portions 37 is one. The remainder of configuration, function and effects of the present embodiment are similar to those of the first embodiment.

Fifth Embodiment

Figure 12:
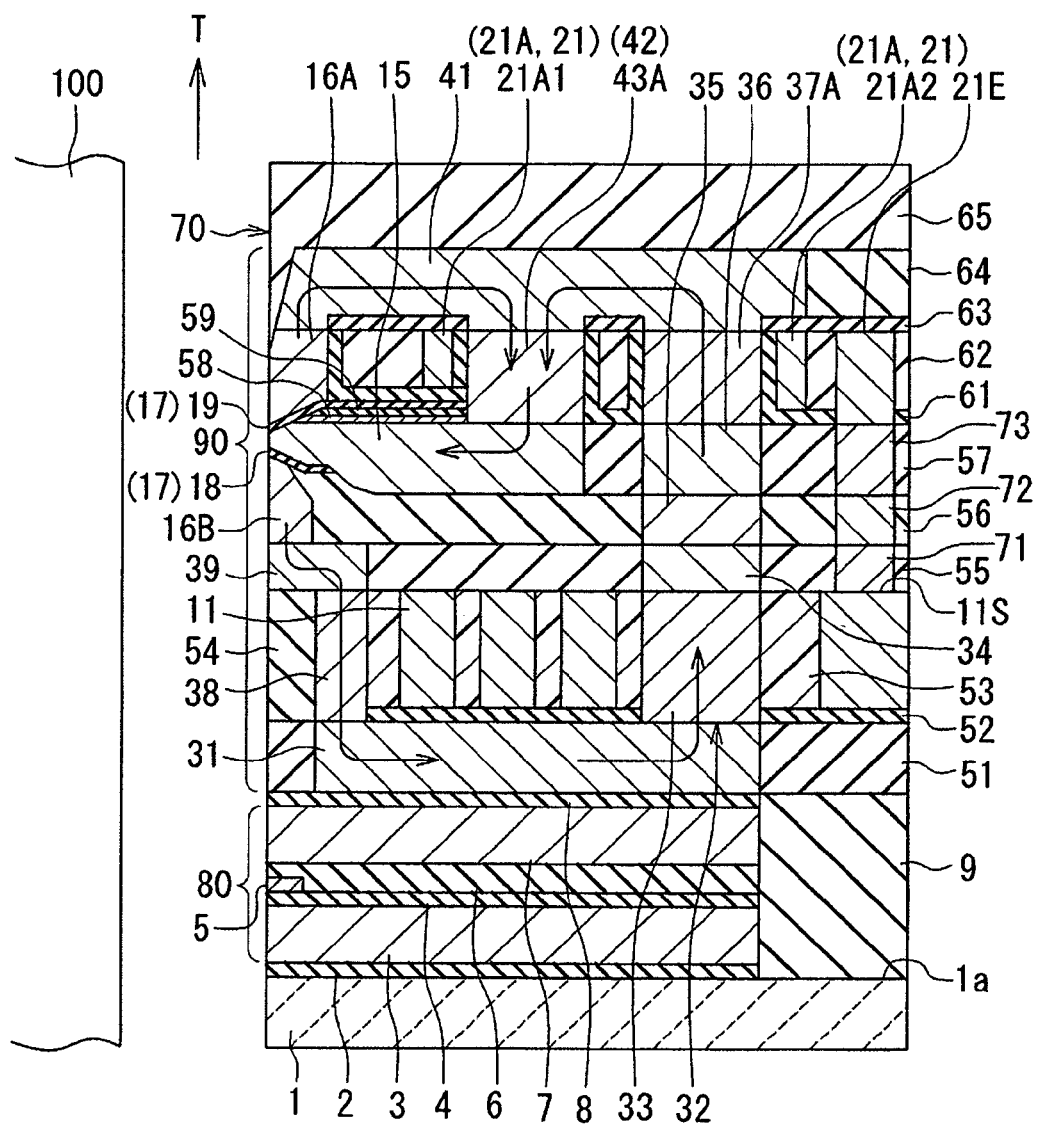
FIG. 12 is a cross-sectional view showing a magnetic head according to a fifth embodiment of the invention.
Figure 13:
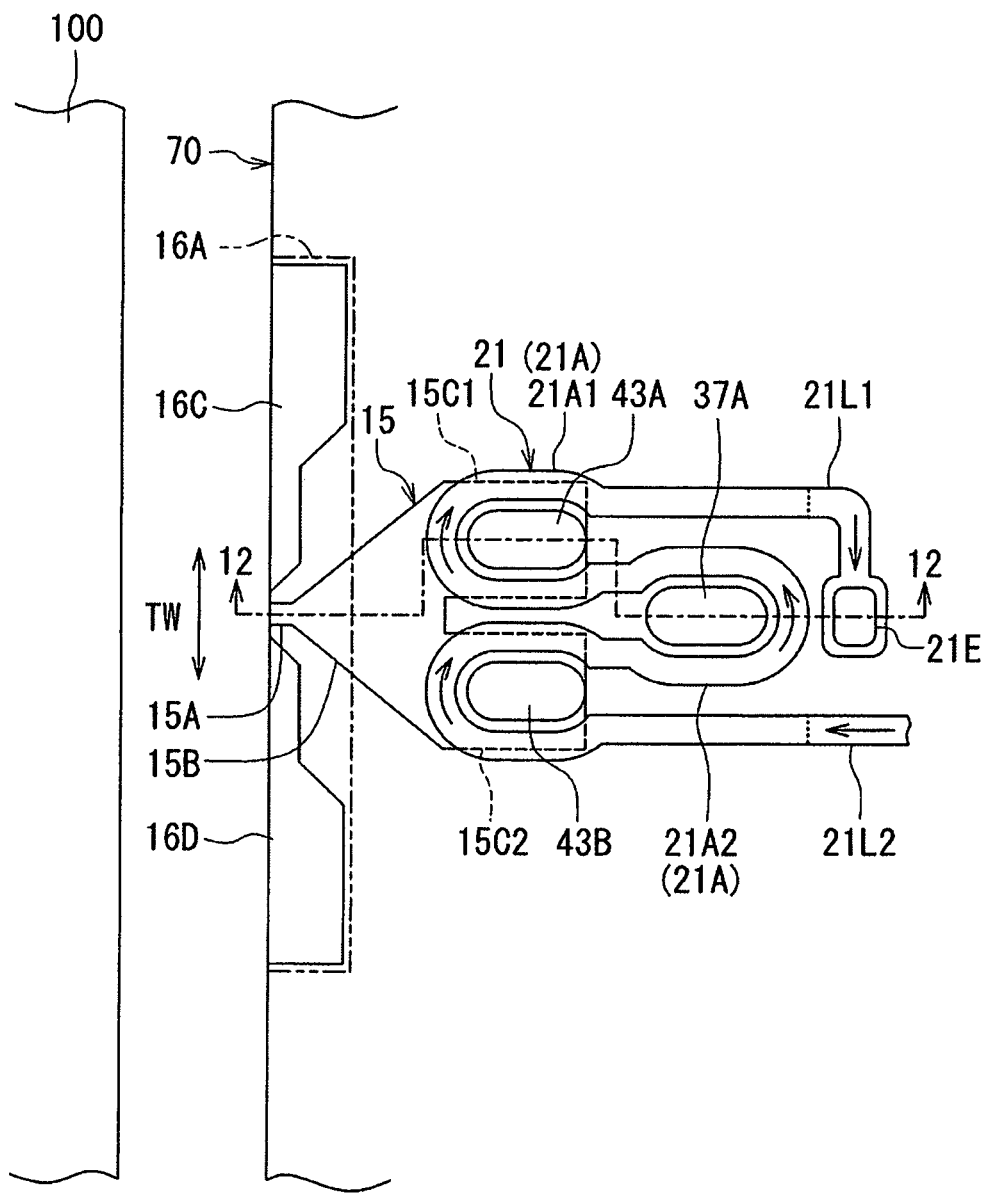
FIG. 13 is a plan view showing the main part of the magnetic head according to the fifth embodiment of the invention.

A magnetic head according to a fifth embodiment of the invention will now be described with reference to FIG. 12 and FIG. 13. FIG. 12 is a cross-sectional view showing the magnetic head according to the present embodiment. FIG. 13 is a plan view showing the main part of the magnetic head according to the present embodiment. Note that FIG. 12 shows a cross section taken at the position indicated by line 12-12 of FIG. 13.

The magnetic head according to the present embodiment is different from the magnetic head according to the fourth embodiment in the following ways. In the magnetic head according to the present embodiment, the coil includes the second portion 11 described in the third embodiment section in addition to the first portion 21. The first portion 21 includes the first winding portion 21A described in the fourth embodiment section, and lead portions 21L1 and 21L2 connected to opposite ends of the first winding portion 21A. The lead portion 21L1 has the coil connection part 21E described in the third embodiment section. Further, the present embodiment is provided with the magnetic layers 33, 34, 38 and 39, the insulating layers 52 to 55 and the connection layers 71 to 73 described in the third embodiment section.

The remainder of configuration, function and effects of the present embodiment are similar to those of the third or fourth embodiment.

Sixth Embodiment

Figure 14:
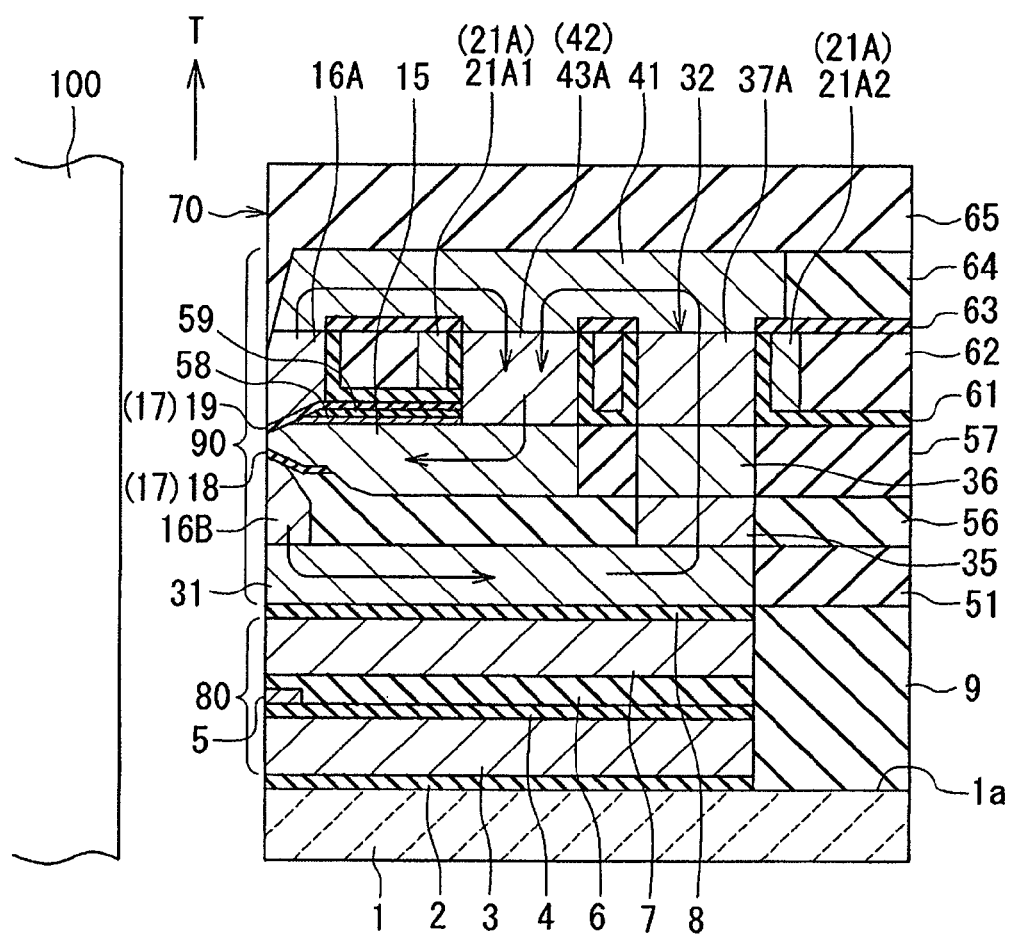
FIG. 14 is a cross-sectional view showing a magnetic head according to a sixth embodiment of the invention.
Figure 15:
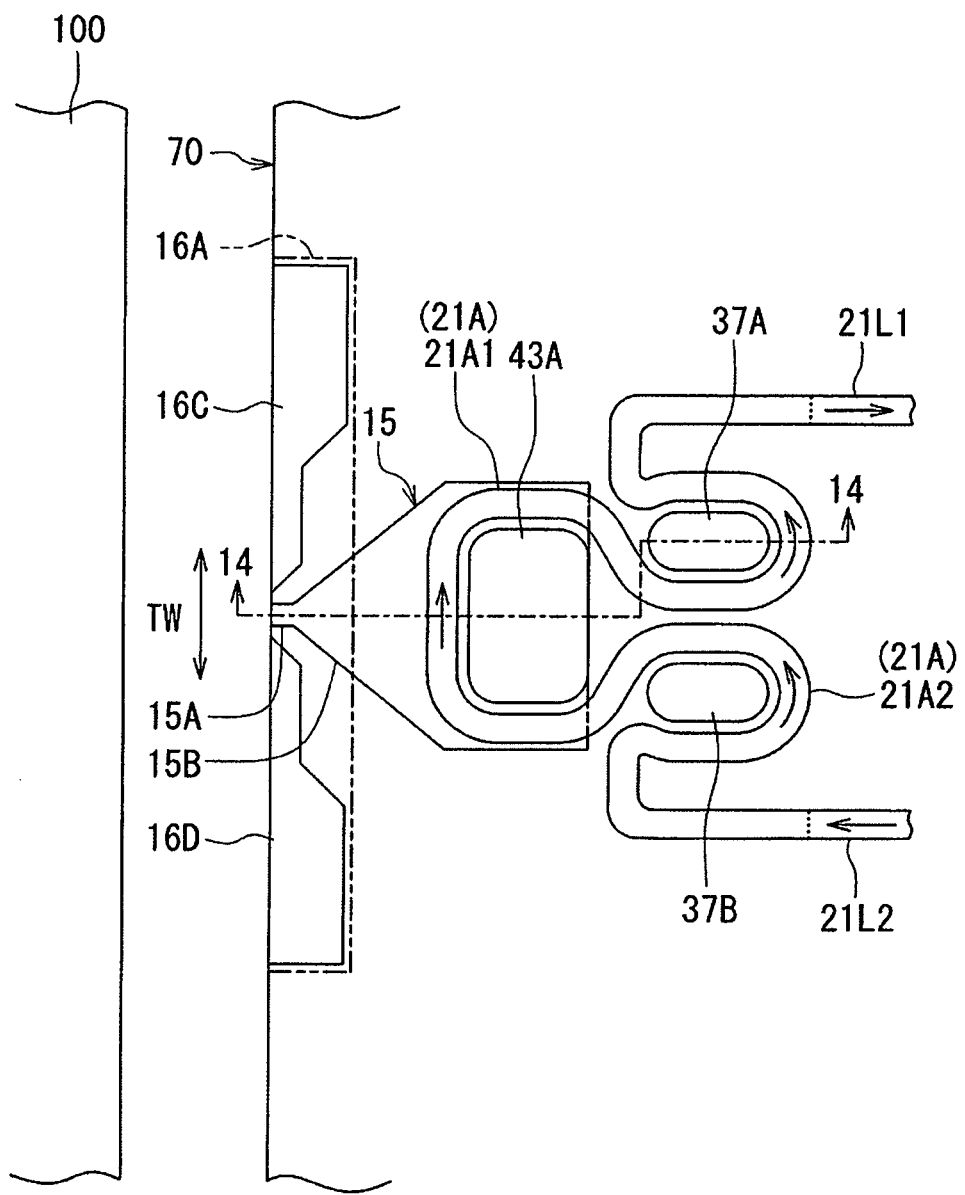
FIG. 15 is a plan view showing the main part of the magnetic head according to the sixth embodiment of the invention.

A magnetic head according to a sixth embodiment of the invention will now be described with reference to FIG. 14 and FIG. 15. FIG. 14 is a cross-sectional view showing the magnetic head according to the present embodiment. FIG. 15 is a plan view showing the main part of the magnetic head according to the present embodiment. Note that FIG. 14 shows a cross section taken at the position indicated by line 14-14 of FIG. 15.

The magnetic head according to the present embodiment is different from the magnetic head according to the first embodiment in the following ways. In the magnetic head according to the present embodiment, the main pole 15 includes no branch portion. The width of the top surface of the wide portion 15B of the main pole 15 in the track width direction TW gradually increases with increasing distance from the medium facing surface 70, and then becomes constant.

Further, in the present embodiment, the first coupling part 42 includes one first magnetic path portion 43A as the one or more first magnetic path portions 43, and the second coupling part 32 includes two second magnetic path portions 37A and 37B as the one or more second magnetic path portions 37. As shown in FIG. 15, the first magnetic path portion 43A is located on the wide portion 15B of the main pole 15. The second magnetic path portions 37A and 37B are located farther from the medium facing surface 70 than are the main pole 15 and the first magnetic path portion 43A.

The second magnetic path portions 37A and 37B are arranged in this order from the top of FIG. 15. Concerning the positional relation in the track width direction TW, the magnetic path portion 43A is located between the magnetic path portions 37A and 37B. In the present embodiment, the first winding portion 21A of the coil extends from the top of FIG. 15 to be wound approximately one turn around each of the magnetic path portions 37A, 43A, and 37B in this order.

In the present embodiment, the number of the one or more first magnetic path portions 43 is one, and the number of the one or more second magnetic path portions 37 is two. The remainder of configuration, function and effects of the present embodiment are similar to those of the first embodiment.

Seventh Embodiment

Figure 16:
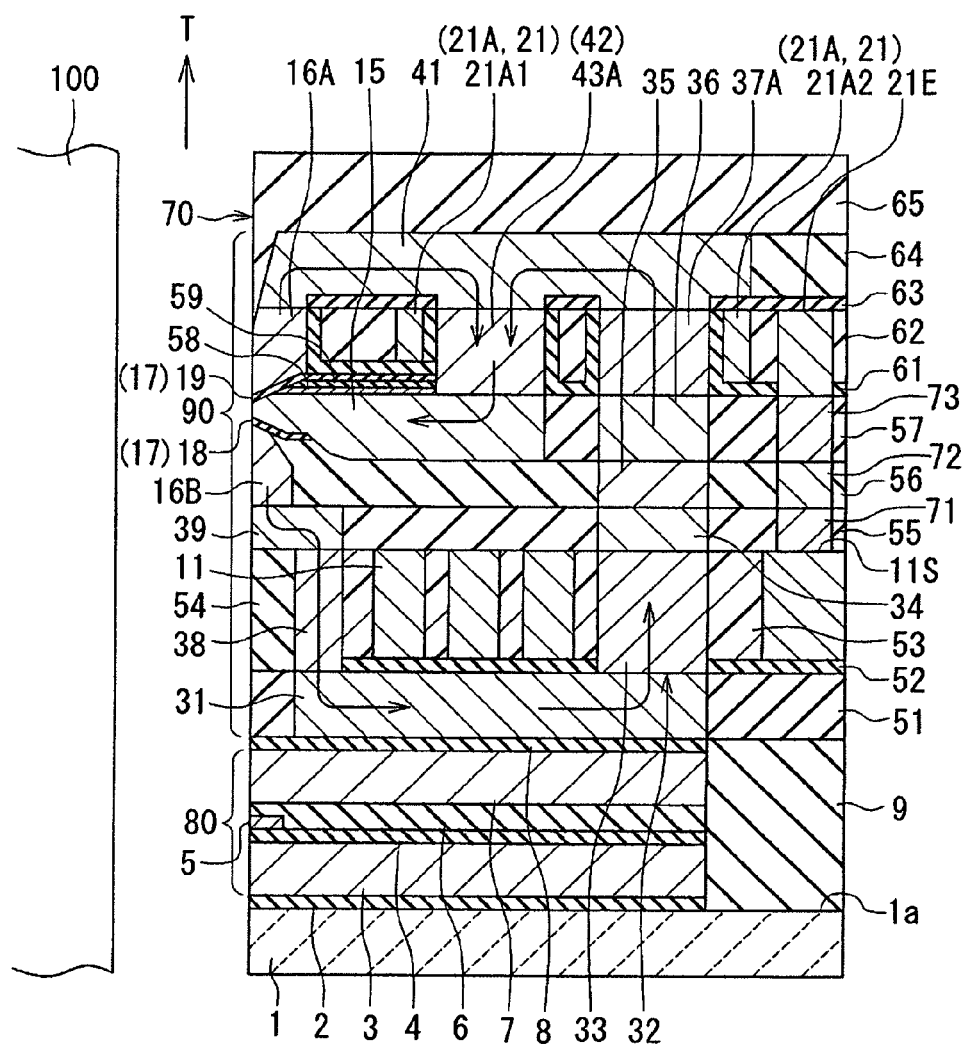
FIG. 16 is a cross-sectional view showing a magnetic head according to a seventh embodiment of the invention.
Figure 17:
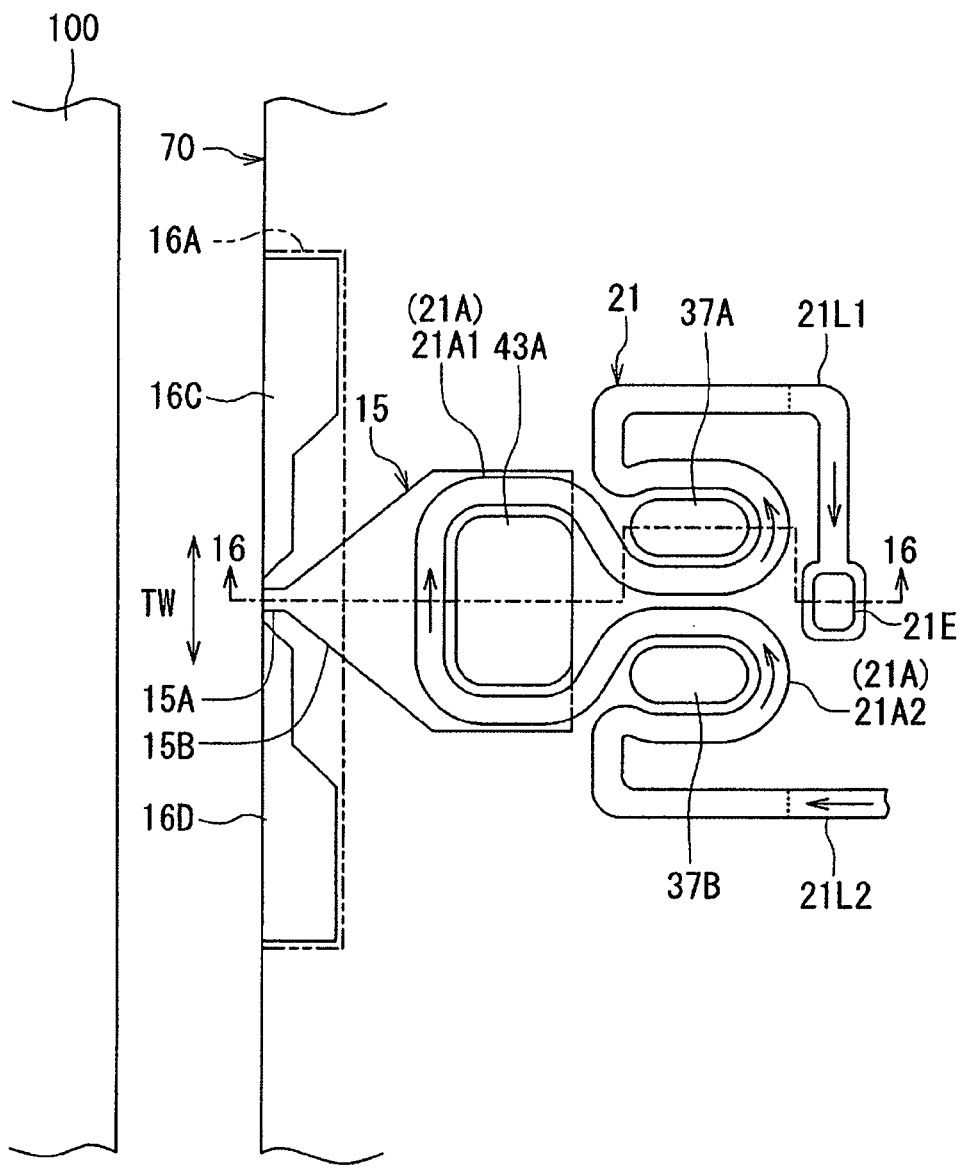
FIG. 17 is a plan view showing the main part of the magnetic head according to the seventh embodiment of the invention.

A magnetic head according to a seventh embodiment of the invention will now be described with reference to FIG. 16 and FIG. 17. FIG. 16 is a cross-sectional view showing the magnetic head according to the present embodiment. FIG. 17 is a plan view showing the main part of the magnetic head according to the present embodiment. Note that FIG. 16 shows a cross section taken at the position indicated by line 16-16 of FIG. 17.

The magnetic head according to the present embodiment is different from the magnetic head according to the sixth embodiment in the following ways. In the magnetic head according to the present embodiment, the coil includes a first portion 21, and the second portion 11 described in the third embodiment section. The first portion 21 includes the first winding portion 21A described in the sixth embodiment section, and lead portions 21L1 and 21L2 connected to opposite ends of the first winding portion 21A. The lead portion 21L1 has the coil connection part 21E described in the third embodiment section. Further, the present embodiment is provided with the magnetic layers 33, 34, 38 and 39, the insulating layers 52 to 55 and the connection layers 71 to 73 described in the third embodiment section.

The remainder of configuration, function and effects of the present embodiment are similar to those of the third or sixth embodiment.

The present invention is not limited to the foregoing embodiments, and various modifications may be made thereto. For example, as far as the requirements of the appended claims are met, the numbers, shapes and locations of the first and second magnetic path portions 43 and 37 are not limited to the examples illustrated in the foregoing embodiments, and can be chosen as desired.

Further, the magnetic head of the present invention may be provided with means for applying heat to the recording medium 100 to serve as a thermally-assisted magnetic recording head.

It is apparent that the present invention can be carried out in various forms and modifications in the light of the foregoing descriptions. Accordingly, within the scope of the following claims and equivalents thereof, the present invention can be carried out in forms other than the foregoing most preferable embodiments.

What is claimed is:

1. A magnetic head for perpendicular magnetic recording, comprising:
    a medium facing surface facing a recording medium;
    a coil producing a magnetic field corresponding to data to be written on the recording medium;
    a main pole having an end face located in the medium facing surface, the main pole allowing a magnetic flux that corresponds to the magnetic field produced by the coil to pass, and producing a write magnetic field for writing the data on the recording medium;
    a write shield made of a magnetic material and having an end face located in the medium facing surface;
    a gap part made of a nonmagnetic material and interposed between the main pole and the write shield;
    a first yoke layer made of a magnetic material, magnetically connected to the write shield and located on a front side in a direction of travel of the recording medium relative to the main pole;
    a second yoke layer made of a magnetic material, magnetically connected to the write shield and located on a rear side in the direction of travel of the recording medium relative to the main pole;
    a first coupling part located away from the medium facing surface and magnetically coupling the main pole and the first yoke layer to each other;
    a second coupling part located away from the medium facing surface and magnetically coupling the first yoke layer and the second yoke layer to each other without touching the main pole, wherein
    the end face of the write shield includes a first end face portion located on the front side in the direction of travel of the recording medium relative to the end face of the main pole,
    the first coupling part includes one or more first magnetic path portions that allow a first magnetic flux passing through the first coupling part to pass therethrough,
    the second coupling part includes one or more second magnetic path portions that allow a second magnetic flux passing through the second coupling part to pass therethrough,
    one or both of the first and second magnetic path portions are two or more in number so as to separate one or both of the first and second magnetic fluxes into two or more magnetic fluxes traveling in parallel to each other,
    the one or more first magnetic path portions and the one or more second magnetic path portions are disposed to intersect a cross section perpendicular to the direction of travel of the recording medium,
    the coil includes one first winding portion extending to pass around the first and second magnetic path portions alternately in a zigzag manner, and
    one or more magnetic fields produced in the one or more first magnetic path portions by the first winding portion and one or more magnetic fields produced in the one or more second magnetic path portions by the first winding portion are in directions opposite to each other.

2. The magnetic head for perpendicular magnetic recording according to claim 1, wherein the end face of the write shield further includes a second end face portion located on the rear side in the direction of travel of the recording medium relative to the end face of the main pole.

3. The magnetic head for perpendicular magnetic recording according to claim 2, wherein the end face of the write shield further includes third and fourth end face portions located on opposite sides of the end face of the main pole in a track width direction.

4. The magnetic head for perpendicular magnetic recording according to claim 1, wherein both of the first and second magnetic path portions are two or more in number.

5. The magnetic head for perpendicular magnetic recording according to claim 1, wherein the number of the one or more first magnetic path portions is two, and the number of the one or more second magnetic path portions is one.

6. The magnetic head for perpendicular magnetic recording according to claim 1, wherein the number of the one or more first magnetic path portions is one, and the number of the one or more second magnetic path portions is two.

7. The magnetic head for perpendicular magnetic recording according to claim 1, wherein the coil further includes a second winding portion wound around the second coupling part, the second winding portion being located at a position different from that of the first winding portion in the direction of travel of the recording medium.

* * * * *